(12) United States Patent
Yokota et al.

(10) Patent No.: US 12,078,508 B2
(45) Date of Patent: Sep. 3, 2024

(54) METHOD FOR GENERATING MAP AND MAP GENERATION DEVICE

(71) Applicant: DENSO CORPORATION, Kariya (JP)

(72) Inventors: Minoru Yokota, Kariya (JP); Yasunori Katayama, Obu (JP)

(73) Assignee: DENSO CORPORATION, Kariya (JP)

( * ) Notice: Subject to any disclaimer, the term of this patent is extended or adjusted under 35 U.S.C. 154(b) by 562 days.

(21) Appl. No.: 17/186,926

(22) Filed: Feb. 26, 2021

(65) Prior Publication Data
US 2021/0180985 A1 Jun. 17, 2021

Related U.S. Application Data

(63) Continuation of application No. PCT/JP2019/032846, filed on Aug. 22, 2019.

(30) Foreign Application Priority Data

Aug. 31, 2018 (JP) .................................. 2018-163076
Aug. 1, 2019 (JP) .................................. 2019-142255

(51) Int. Cl.
*G01C 21/00* (2006.01)
(52) U.S. Cl.
CPC ................. *G01C 21/3859* (2020.08)
(58) Field of Classification Search
CPC . G01C 21/3859; G01C 21/3819; G06T 11/60; G08G 1/0112; G09B 29/10
See application file for complete search history.

(56) References Cited

U.S. PATENT DOCUMENTS

| 2008/0262721 | A1 | 10/2008 | Guo et al. |
| 2010/0110412 | A1* | 5/2010 | Basu ..................... G01C 15/002 356/3 |
| 2010/0287485 | A1* | 11/2010 | Bertolami ............... G06F 3/011 715/764 |
| 2016/0170414 | A1* | 6/2016 | Chen .................... G06F 18/2453 701/27 |

(Continued)

FOREIGN PATENT DOCUMENTS

| EP | 3208740 A1 * | 8/2017 | ............... B60R 1/00 |
| JP | 3707770 B2 * | 10/2005 | ......... G01C 21/3673 |

(Continued)

OTHER PUBLICATIONS

English Translation for EP-3208740-A1 (Year: 2017).*
English Translation for JP-3707770-B2 (Year: 2005).*
English Translation for JP-2018073208-A (Year: 2018).*

*Primary Examiner* — Rachid Bendidi
*Assistant Examiner* — Moises Gasca Alva
(74) *Attorney, Agent, or Firm* — MASCHOFF BRENNAN

(57) ABSTRACT

A method for generating a map includes: acquiring a segment including a dividing line and a landmark on a road using a segment acquisition unit, setting a common landmark common with another segment, in the segment acquired by the segment acquisition unit using a common landmark setting unit, setting a dividing line in the segment using the common landmark set by the common landmark setting unit using a dividing line setting unit, and identifying the dividing line in the segment set by the dividing line setting unit, as a dividing line on a map and generates map data using a map data generation unit.

9 Claims, 26 Drawing Sheets

(56) References Cited

U.S. PATENT DOCUMENTS

| | | |
|---|---|---|
| 2017/0008562 A1 | 1/2017 | Shashua et al. |
| 2018/0023960 A1 | 1/2018 | Fridman |
| 2018/0025235 A1* | 1/2018 | Fridman .............. H04N 13/239 |
| | | 382/103 |
| 2021/0199437 A1* | 7/2021 | Breed ...................... G06N 3/02 |

FOREIGN PATENT DOCUMENTS

| | | | |
|---|---|---|---|
| JP | 4718396 B2 | | 4/2011 |
| JP | 2018073208 A | * | 5/2018 |

* cited by examiner

SEGMENT 1+2

SET LANDMARKS 1, 2, 4, AND 5 AS COMMON LANDMARK CANDIDATES

SEGMENT 1

SEGMENT 2

SEGMENT 1+2

SET LANDMARKS 1, 2, 4, AND 5 AS COMMON LANDMARK CANDIDATES

SET LANDMARKS 1, 2, 4, AND 5 AS COMMON LANDMARKS

SET LANDMARKS 1, 2, 4, AND 5 AS COMMON LANDMARKS

SET LANDMARKS 1, 2, 3, AND 5 AS COMMON LANDMARKS

SET LANDMARKS 1, 2, 4, AND 5 AS COMMON LANDMARKS

FIG.31
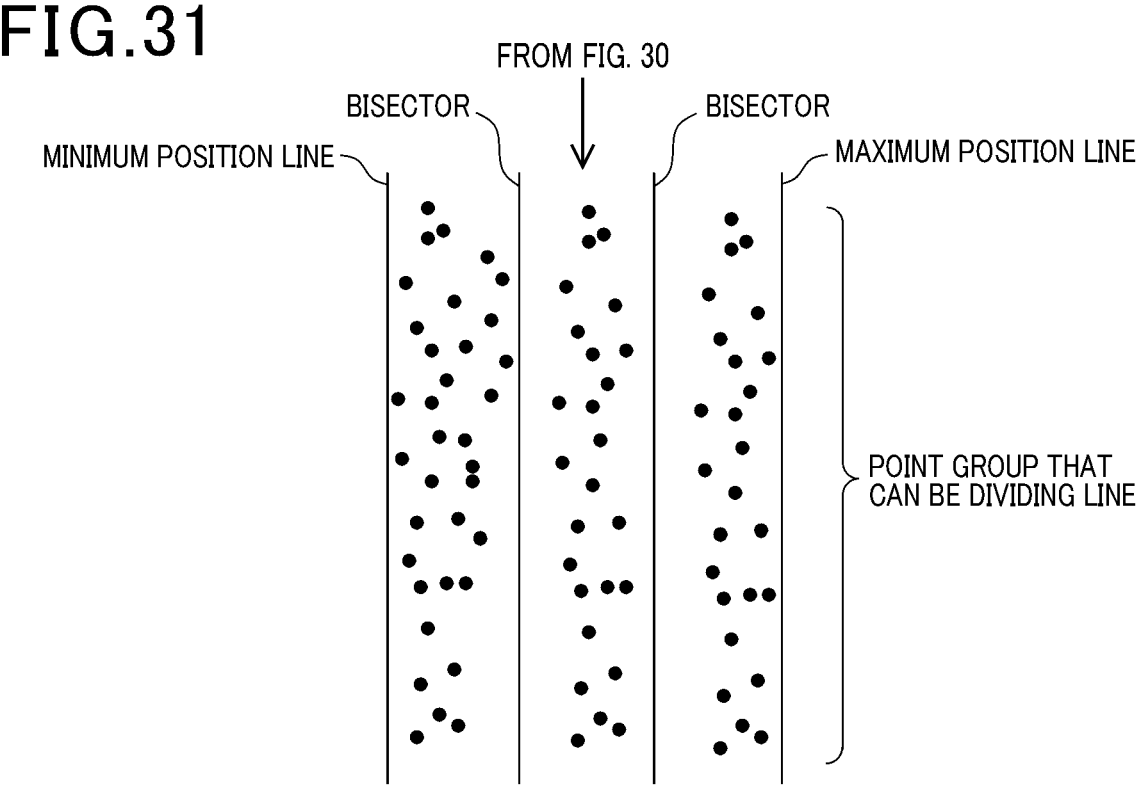
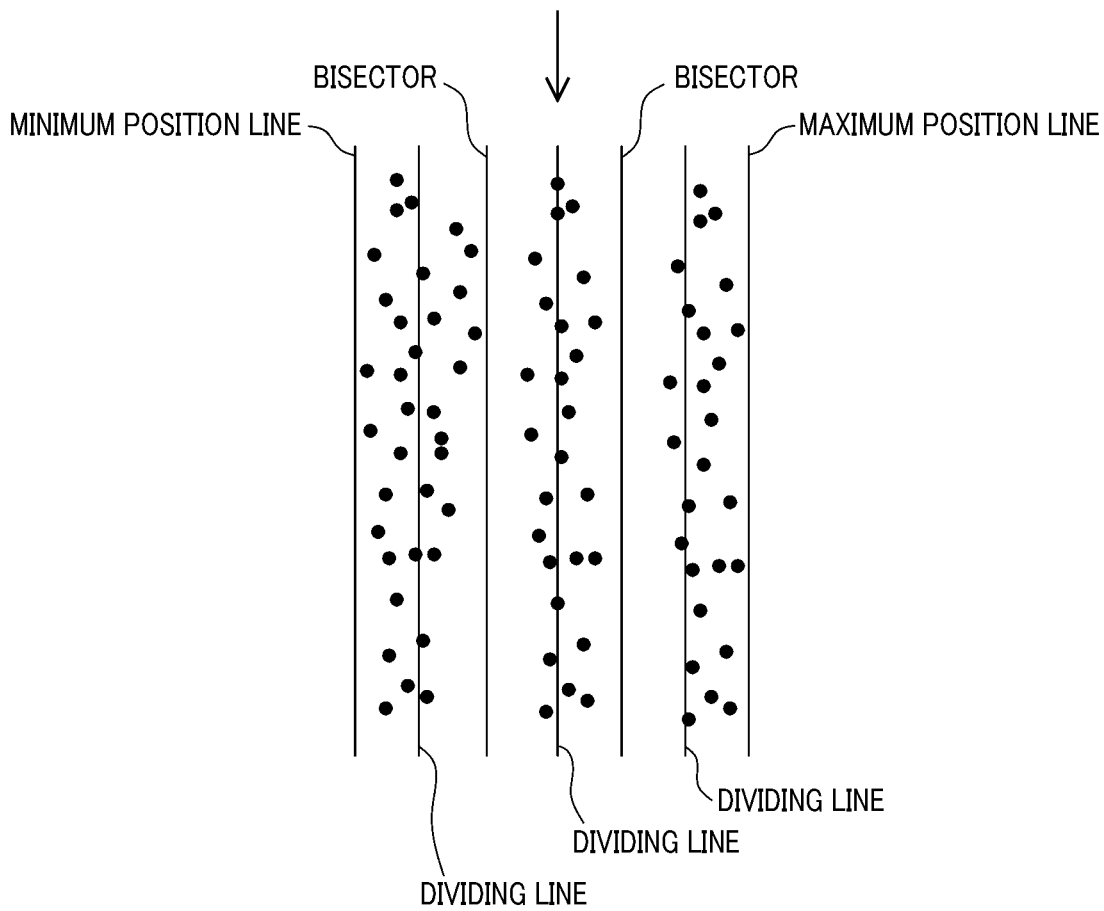

METHOD FOR GENERATING MAP AND MAP GENERATION DEVICE

CROSS-REFERENCE TO RELATED APPLICATION

This application is the U.S. bypass application of International Application No. PCT/JP2019/032846 filed on Aug. 22, 2019 which designated the U.S. and claims priority to earlier Japanese Application No. 2018-163076 filed on Aug. 31, 2018, and Japanese Patent Application No. 2019-142255 filed on Aug. 1, 2019, the contents of both of which are incorporated herein by reference.

TECHNICAL FIELD

The present disclosure relates to a method for generating a map and a map generation device.

BACKGROUND

There has been provided a map generation device that acquires probe information from a vehicle side and generates a map using the acquired probe information. For example, JP 5064870 B2 discloses a method for calculating the center line of a road using a traveling locus of a vehicle based on GPS (Global Positioning System) coordinates.

SUMMARY

According to one aspect of the present disclosure, a segment acquisition unit acquires a segment including a dividing line and a landmark on a road. When a segment is acquired by the segment acquisition unit, a common landmark setting unit sets a common landmark common with another segment, in the acquired segment. When a common landmark is set by the common landmark setting unit, a dividing line setting unit sets a dividing line in the segment using the set common landmark. When the dividing line in the segment is set by the dividing line setting unit, a map data generation unit identifies the dividing line in the set segment as a dividing line on a map and generates map data.

BRIEF DESCRIPTION OF THE DRAWINGS

The above features of the present disclosure will be made clearer by the following detailed description, given referring to the appended drawings. In the accompanying drawings:

FIG. 31 is a third diagram for explaining a process for setting a dividing line.

DETAILED DESCRIPTION OF THE PREFERRED EMBODIMENTS

The method disclosed in JP 5064870 B2 has a problem that the accuracy cannot be improved if the number of samples is small due to the large variation in GPS coordinates, and a large number of samples are required to improve the accuracy. Under such circumstances, a mechanism for generating a highly accurate map even with a small number of samples is required.

An object of the present disclosure is to appropriately generate a highly accurate map even with a small number of samples.

According to one aspect of the present disclosure, a segment acquisition unit acquires a segment including a dividing line and a landmark on a road. When a segment is acquired by the segment acquisition unit, a common landmark setting unit sets a common landmark common with another segment, in the acquired segment. When a common landmark is set by the common landmark setting unit, a dividing line setting unit sets a dividing line in the segment using the set common landmark. When the dividing line in the segment is set by the dividing line setting unit, a map data generation unit identifies the dividing line in the set segment as a dividing line on a map and generates map data.

In a segment including a dividing line and a landmark on the road, a dividing line in the segment is set using a common landmark common with another segment, and the dividing line in the set segment is identified as a dividing line on a map and map data is generated. Rather than using GPS coordinates with large variations, the dividing line in the segment is set using the common landmark, the set dividing line is identified as a dividing line on a map and map data is generated, and it is thereby possible to appropriately generate a map with high accuracy even with a small number of samples.

Figure 1:
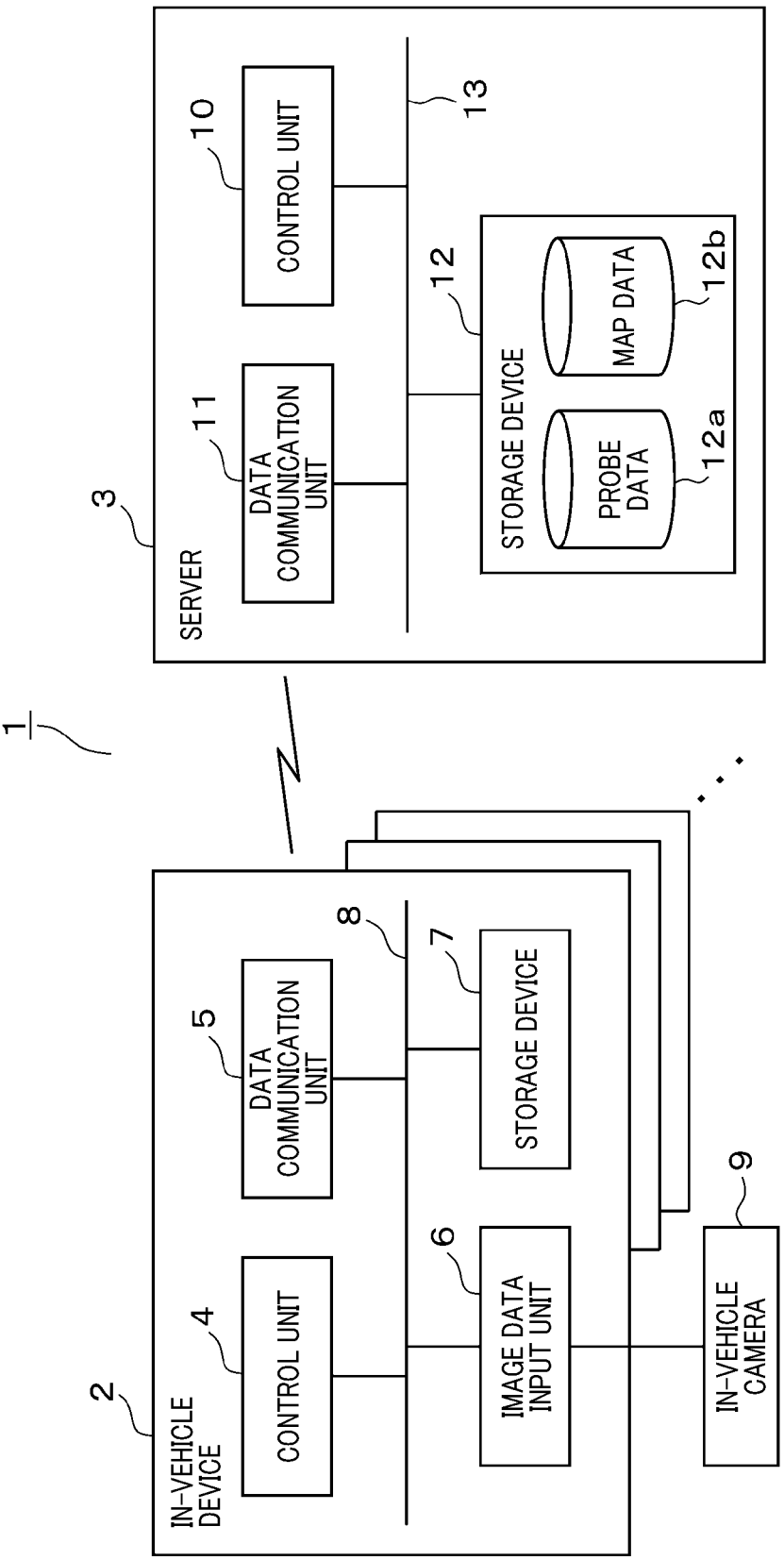
FIG. 1 is a functional block diagram illustrating an overall configuration of a map generation system of one embodiment.

Hereinafter, one embodiment will be described with reference to the drawings. As illustrated in FIG. 1, a map generation system 1 is configured in such a manner that in-vehicle devices 2 mounted on the vehicle side and a server 3 (corresponding to the map generation device) disposed on the network side can perform data communication. The in-vehicle devices 2 and the server 3 have a plurality of one-to-one relations, and the server 3 can perform data communication with a plurality of in-vehicle devices 2.

The in-vehicle devices 2 include a control unit 4, a data communication unit 5, an image data input unit 6, and a storage device 7, and each functional block is configured to be able to perform data communication via an internal bus 8. The control unit 4 includes a microcomputer having a CPU (Central Processing Unit), a ROM (Read Only Memory), a RAM (Random Access Memory), and an I/O (Input/Output) device. By executing a computer program stored in a non-transitional tangible storage medium, the microcomputer executes a process corresponding to the computer program and controls the overall operation of the in-vehicle devices 2.

The data communication unit 5 controls data communication with the server 3. An in-vehicle camera 9 is provided separately from the in-vehicle devices 2, captures a region in front of the vehicle, and outputs the captured image data to the in-vehicle devices 2. When inputting image data from the in-vehicle camera 9, the image data input unit 6 outputs the input image data to the control unit 4. The control unit 4 periodically stores, in the storage device 7 as probe data, data including a vehicle position measured using the GPS signal received by a GPS (Global Positioning System) receiver, a time when the vehicle position is measured, and a segment generated from the image data input from the in-vehicle camera 9. The control unit 4 reads probe data from the storage device 7 every time a predetermined time elapses or the travel distance of the vehicle reaches a predetermined distance, and causes the data communication unit 5 to transmit the read probe data to the server 3. Moreover, in the present embodiment, a case where a segment is generated from the image data captured by the in-vehicle camera 9 is illustrated. However, the segment may be generated from the measurement data acquired by a measuring device different from the in-vehicle camera 9. In addition, the image data and the measurement data may be used in combination, and a segment may be generated from the image data and the measurement data.

The server 3 includes a control unit 10, a data communication unit 11, and a storage device 12, and each functional block is configured to be able to perform data communication via an internal bus 13. The control unit 10 includes a microcomputer having a CPU, a ROM, a RAM, and an I/O device. By executing a computer program stored in a non-transitional tangible storage medium, the microcomputer executes a process corresponding to the computer program and controls the overall operation of the server 3. The computer programs executed by the microcomputer include a map generation program.

The data communication unit 11 controls data communication with the in-vehicle devices 2. The storage device 12 includes a probe data storage unit 12a for storing probe data and a map data storage unit 12b for storing map data. When probe data is received from the in-vehicle devices 2 by the data communication unit 11, the control unit 10 stores the received probe data in the probe data storage unit 12a. That is, since the in-vehicle device machines 2 and the server 3 have a many-to-one relation, the control unit 10 stores a plurality of pieces of probe data received from the plurality of in-vehicle devices 2, in the probe data storage unit 12a. In addition, when generating map data as described later, the control unit 10 stores the generated map data in the map data storage unit 12b. The control unit 10 reads the map data stored in the map data storage unit 12b, and causes the data communication unit 11 to distribute the read map data to the in-vehicle devices 2.

Figure 2:
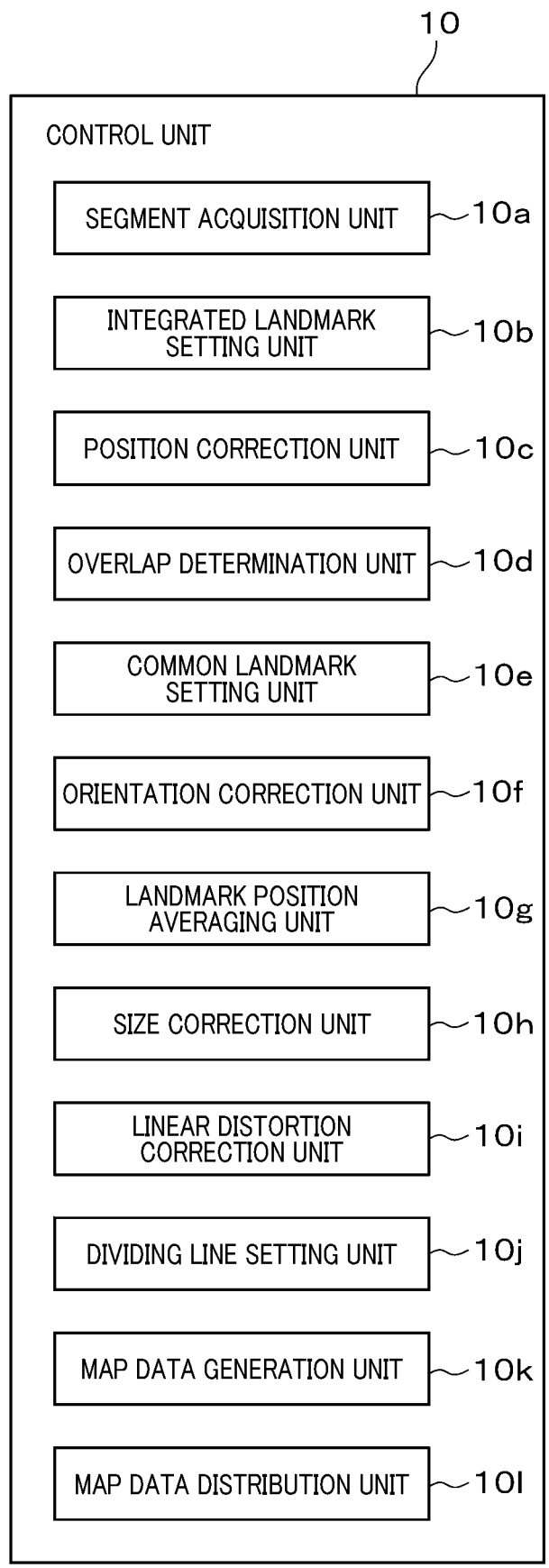
FIG. 2 is a functional block diagram of a control unit in a server.
Figure 3:
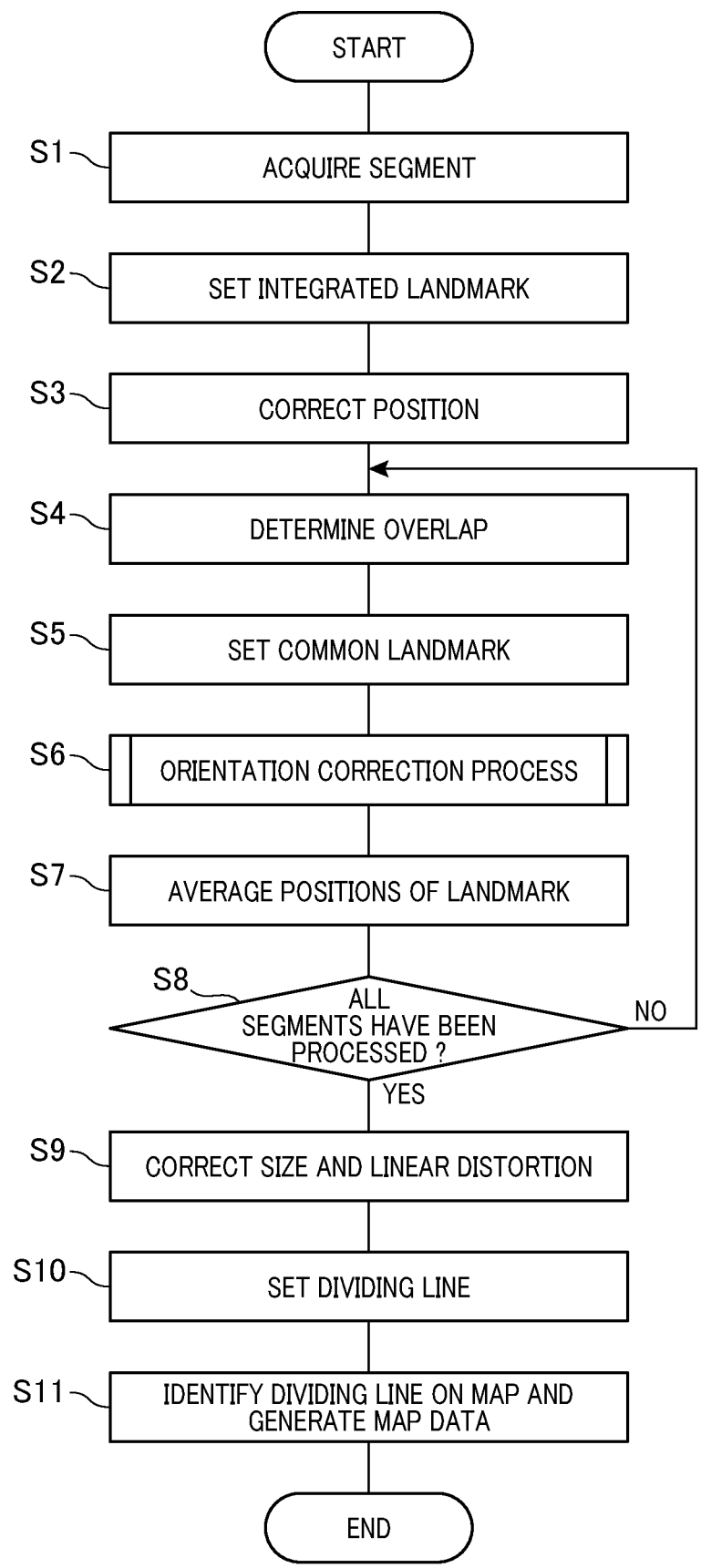
FIG. 3 is a first flowchart.
Figure 4:
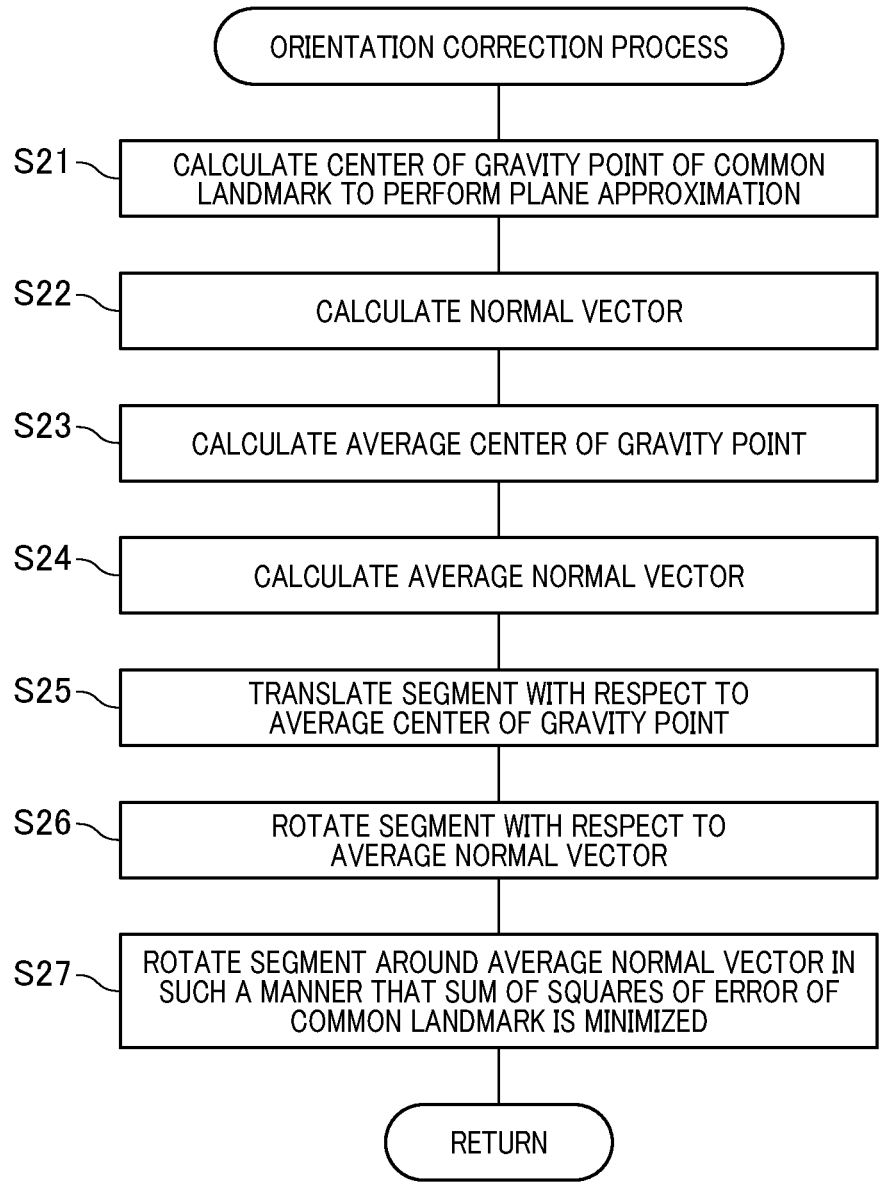
FIG. 4 is a second flowchart.

As illustrated in FIG. 2, the control unit 10 includes a segment acquisition unit 10a, an integrated landmark setting unit 10b, a position correction unit 10c, an overlap determination unit 10d, a common landmark setting unit 10e, an orientation correction unit 10f, a landmark position averaging unit 10g, a size correction unit 10h, a linear distortion correction unit 10i, a dividing line setting unit 10j, a map data generation unit 10k, and a map data distribution unit 10l. These functional blocks correspond to the processing of the map generation program executed by the microcomputer.

The segment acquisition unit 10a reads the probe data stored in the probe data storage unit 12a of the storage device 12, and acquires a segment information from the read probe data. A segment is a unit including a dividing line painted on a road, landmarks indicating a mark such as a sign and a signboard installed on the road, and a traveling locus of a vehicle. Here, considering that there may be landmarks that cannot be set as a common landmark when performing the process for setting a common landmark as described later, it is desirable that the segment acquisition unit 10a acquire a segment including as many landmarks as possible. That is, the segment acquisition unit 10a may compare the number of landmarks included in a segment with a predetermined number, target a segment including the predetermined number or more of the landmarks, and may not have to acquire a segment that does not include the predetermined number or more of landmarks. In addition, the segment acquisition unit 10a may determine the detection accuracy of landmarks, target a segment including a predetermined number or more of landmarks having a predetermined detection level or higher, and may not have to acquire a segment that does not include the predetermined number or more of landmarks having the predetermined detection level or higher.

Here, the predetermined number and the predetermined level may be fixed values, or may be variable values determined according to, for example, the traveling position of the vehicle, the traveling environment, and the like. That is, when the vehicle is traveling in an area where the number of landmarks is relatively small, if the predetermined number is set to a large value, the number of segments that can be acquired may be too small, and thus it is desirable that the predetermined number is set to a small value. On the contrary, when the vehicle is traveling in an area where the number of landmarks is relatively large, if the predetermined number is set to a small value, the number of segments that can be acquired may be too large, and thus it is desirable that the predetermined number is set to a large value. The same applies to the predetermined level. For example, when the vehicle is traveling in an environment where the detection environment is relatively poor due to the influence of the weather, or the like, if the predetermined level is set to a high level, the number of segments that can be acquired may be too small. Therefore, it is desirable to set the predetermined level to a low level. On the contrary, when the vehicle is traveling in an environment where the detection environment is relatively good due to the influence of the weather, or the like, if the predetermined level is set to a low level, the number of segments that can be acquired may be too large. Therefore, it is desirable to set the predetermined level to a high level.

When a segment is acquired by the segment acquisition unit 10a, the integrated landmark setting unit 10b integrates a plurality of landmarks in the acquired segment and sets an integrated landmark.

When a segment is acquired by the segment acquisition unit 10a, the position correction unit 10c corrects the position of the segment in accordance with the GPS coordinates at both ends of the acquired segment. When the position of the segment is corrected by the position correction unit 10c, the overlap determination unit 10d determines the overlap of the position of the corrected segment. That is, when determining that there are a plurality of segments having the same GPS coordinates at both ends of the segments, the overlap determination unit 10d determines that the plurality of segments overlap.

When the overlap of the segment position is determined by the overlap determination unit 10d, the common landmark setting unit 10e sets a common landmark common with another segment, in the segment for which the overlap is determined.

When a common landmark is set by the common landmark setting unit 10e, the orientation correction unit 10f corrects the orientation of the segment in accordance with the position of the set common landmark. Specifically, the orientation correction unit 10f calculates the center of gravity point of the common landmark to approximate on a plane, calculates the normal vector for the plane, calculates the average of the center of gravity points as the average center of gravity point, and calculates the average of normal vectors as the average normal vector. The orientation correction unit 10f translates the segment with respect to the average center of gravity point and rotates it with respect to the average normal vector. The orientation correction unit 10f corrects the orientation of the segment by rotating the segment around the average normal vector in such a manner that the sum of squares of an error of the common landmark is minimized.

When the orientation of the segment is corrected by the orientation correction unit 10f, the landmark position averaging unit 10g averages the landmark positions in the segment whose orientation has been corrected. When the landmark positions are averaged by the landmark position averaging unit 10g, the size correction unit 10h corrects the size of the segment in accordance with the averaged landmark positions. When the landmark positions are averaged by the landmark position averaging unit 10g, the linear distortion correction unit 10i corrects the linear distortion of the segment in accordance with the averaged landmark positions.

When the size of the segment is corrected by the size correction unit 10h and the linear distortion of the segment is corrected by the linear distortion correction unit 10i, the dividing line setting unit 10j sets a dividing line in the segment whose size and linear distortion have been corrected. When a dividing line in the segment is set by the dividing line setting unit 10j, the map data generation unit 10k identifies the set dividing line as a dividing line on the map and generates map data. When the map data is generated by the map data generation unit 10k, the map data distribution unit 101 causes the data communication unit 11 to distribute the generated map data to the in-vehicle devices 2.

Next, the operation of the above configuration will be described with reference to FIGS. 3 to 31.

Figure 5:
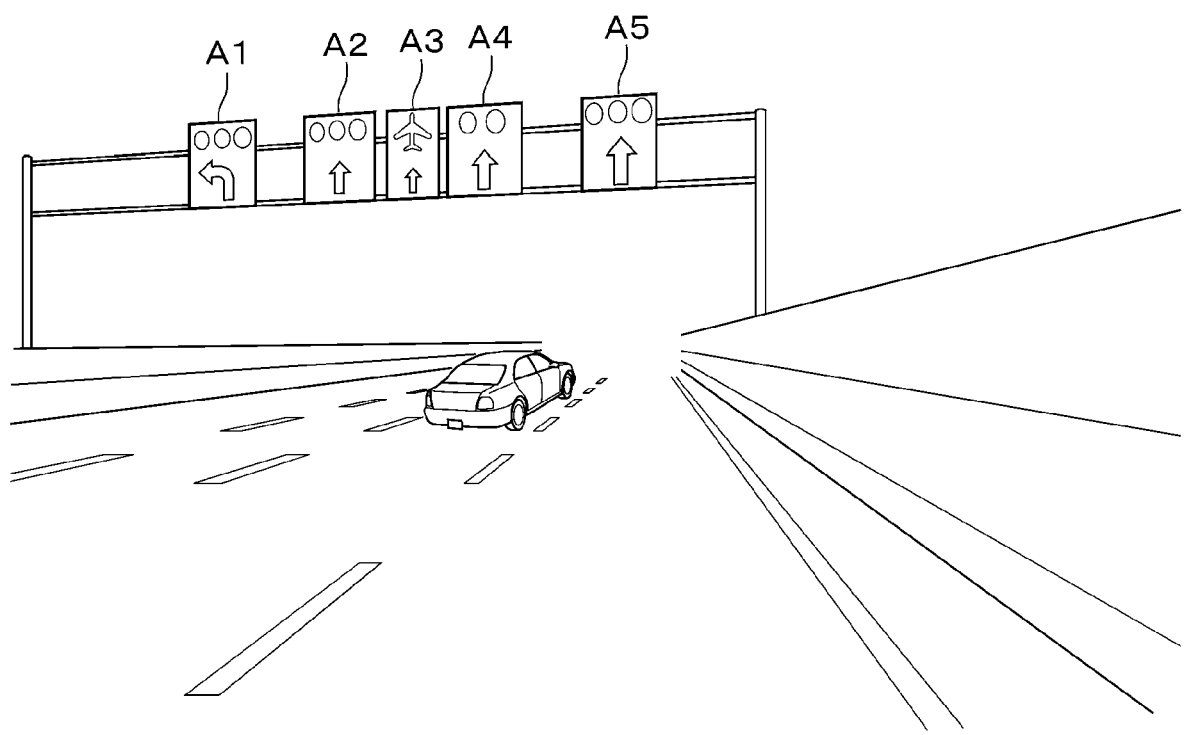
FIG. 5 is a diagram illustrating an aspect in which signs are arranged side by side.
Figure 6:
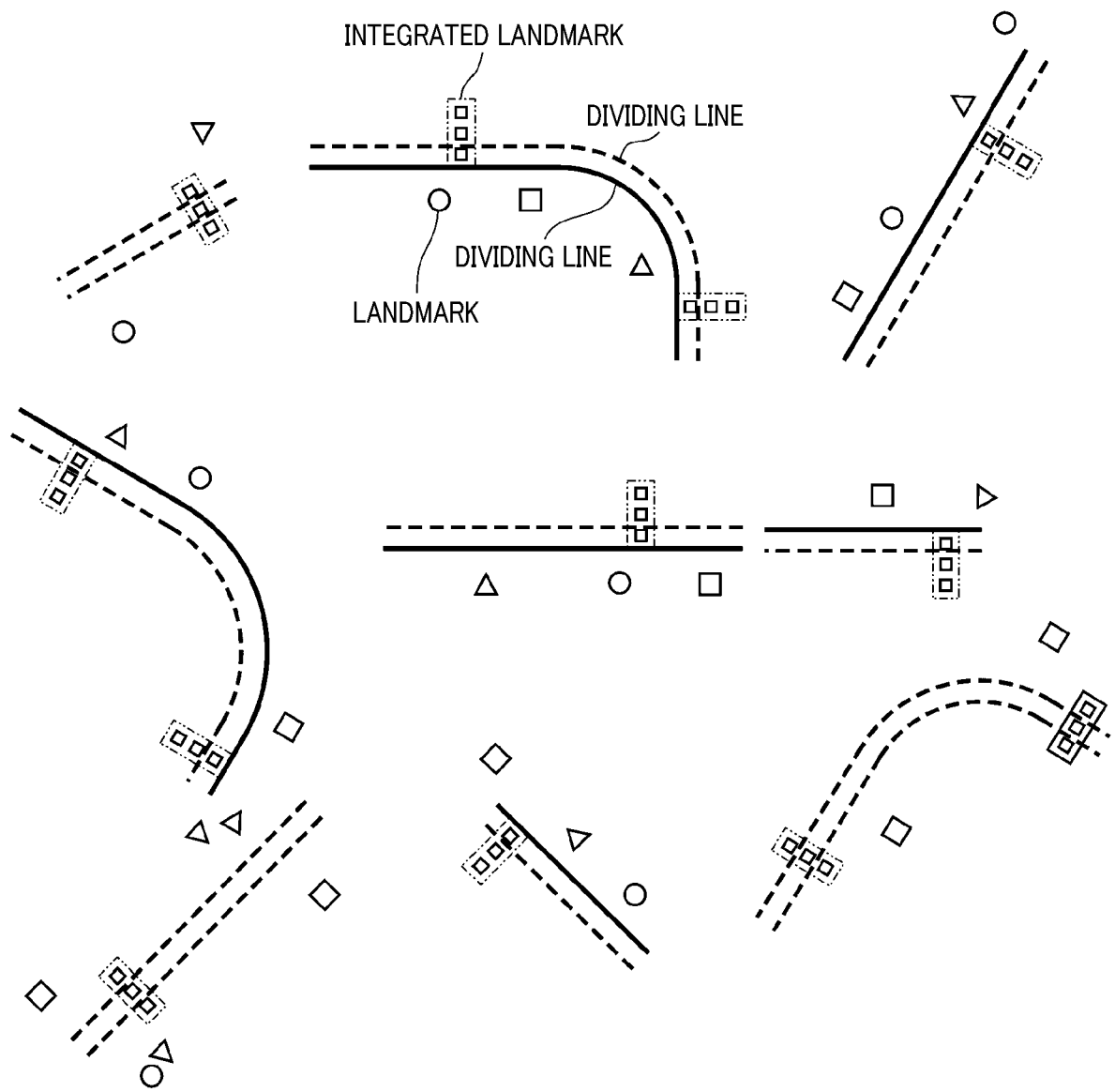
FIG. 6 is a diagram illustrating an aspect of setting an integrated landmark.

When the control unit 10 starts a map generation process in the server 3, the control unit 10 reads a plurality of pieces of probe data stored in the probe data storage unit 12a of the storage device 12 and acquires a plurality of segments from the read plurality of pieces of probe data (S1, corresponding to the segment acquisition step). When the control unit 10 acquires a plurality of segments, the control unit 10 sets an integrated landmark in the acquired plurality of segments (S2). That is, as illustrated in FIG. 5, for example, in a case where a plurality of signs A1 to A5 are arranged side by side on the road, the control unit 10 integrates and sets the landmarks of the arranged signs A1 to A5 as an integrated landmark, as illustrated in FIG. 6. Moreover, the control unit 10 is not limited to integrating the landmarks of a plurality of signs, but may integrate the landmarks of a plurality of signboards, or may mix and integrate sign landmarks and signboard landmarks.

Figure 7:
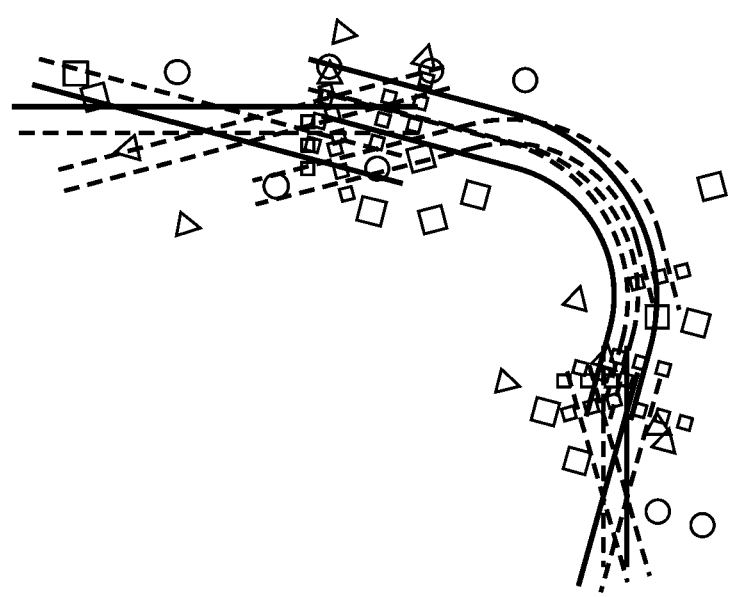
FIG. 7 is a diagram illustrating an aspect of setting a common landmark.

The control unit 10 corrects the position of the segment in accordance with the GPS coordinates (S3), and determines the overlap of the positions of the plurality of segments (S4). A supplement will be described later for a process for determining the overlap of positions of a plurality of segments. When determining that the positions of the plurality of segments overlap, the control unit 10 sets a common landmark (S5, corresponding to the common landmark setting step). That is, as illustrated in FIG. 7, when a single landmark or an integrated landmark common to a plurality of segments exists, the control unit 10 sets the common single landmark or the integrated landmark as a common landmark. A supplementary process will be described later for the process for setting the common landmark. Moreover, the control unit 10 needs to set four or more common landmarks in consideration of identifying a three-dimensional position, and it is necessary that at least four common landmarks are not on the same plane. In addition, it is desirable that the control unit 10 selects common landmarks which are widely separated rather than closely grouped in the segment.

Figure 8:
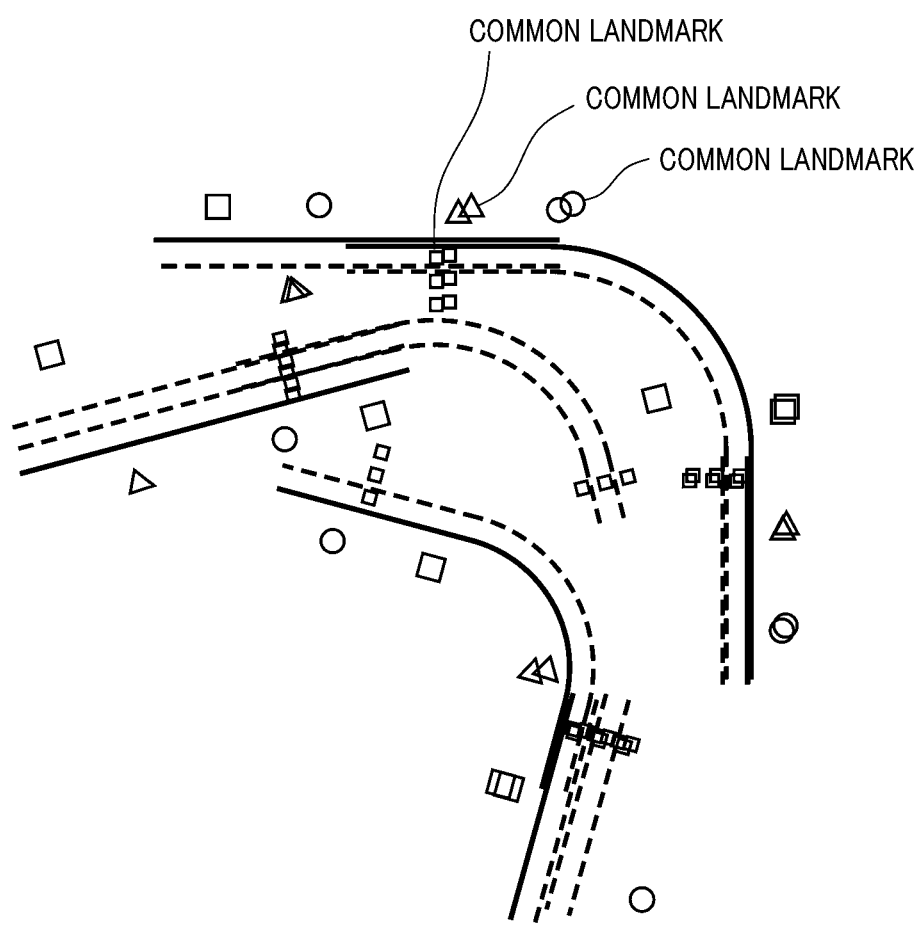
FIG. 8 is a diagram illustrating an aspect before correcting the orientation of a segment.

When a common landmark is set, the control unit 10 proceeds to an orientation correction process (S6), and corrects the orientation of the segment in accordance with the position of the set common landmark. That is, as illustrated in FIG. 8, the control unit 10 corrects the orientation of the segment in accordance with the position of the common landmark.

Figure 9:
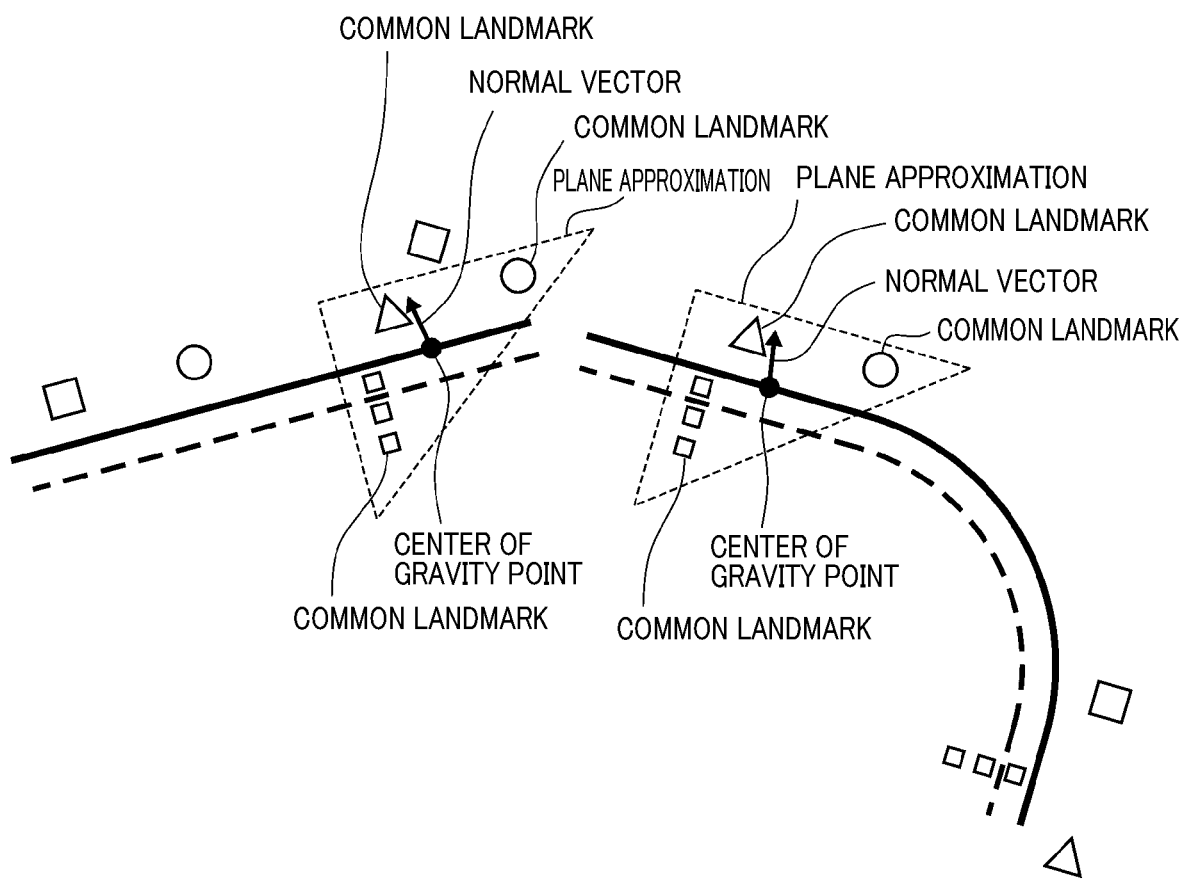
FIG. 9 is a first diagram illustrating an aspect in which the orientation of the segment is being corrected.
Figure 10:
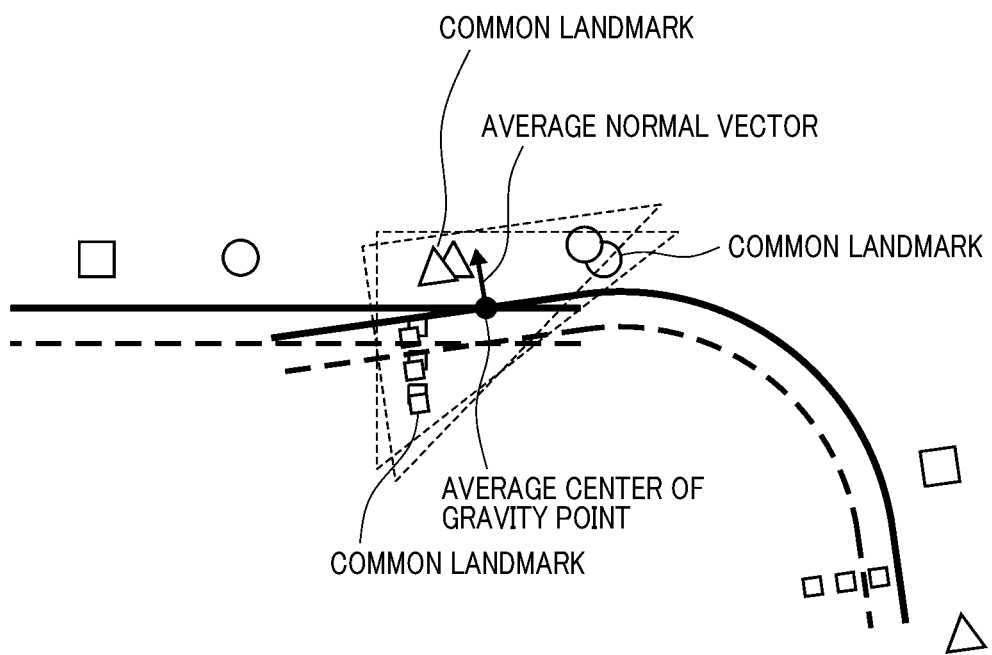
FIG. 10 is a second diagram illustrating an aspect in which the orientation of the segment is being corrected.
Figure 11:
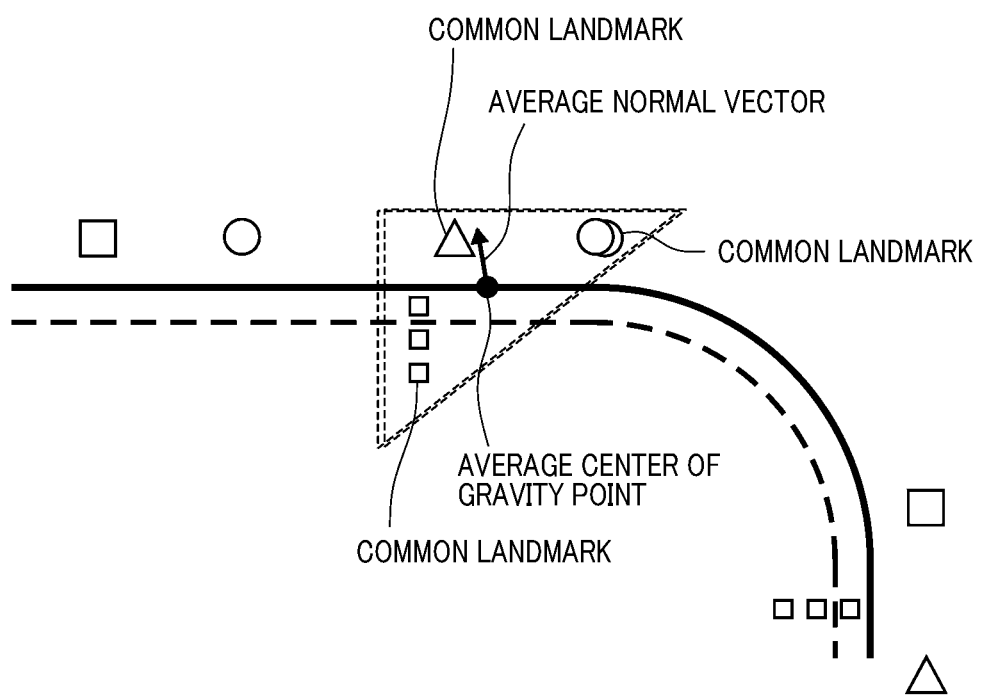
FIG. 11 is a third diagram illustrating an aspect in which the orientation of the segment is being corrected.
Figure 12:
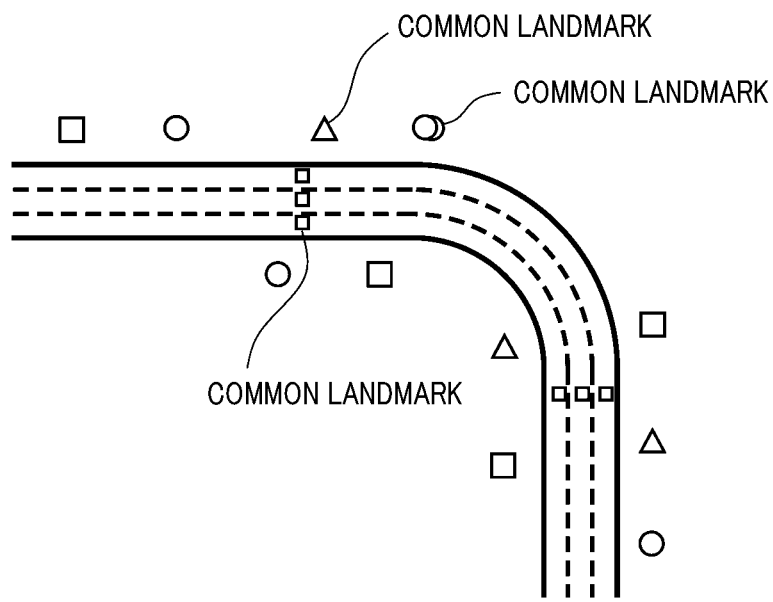
FIG. 12 is a diagram illustrating an aspect after correcting the orientation of the segment.

When the orientation correction process is started, the control unit 10 calculates the center of gravity point of the common landmark to approximate on a plane (S21), and calculates the normal vector for the plane (S22), as illustrated in FIG. 9. As illustrated in FIG. 10, the control unit 10 calculates the average of the center of gravity points as the average center of gravity point (S23), calculates the average of the normal vectors as the average normal vector (S24), and translates the segment with respect to the average center of gravity point (S25), and rotates the segment with respect to the average normal vector (S26). As illustrated in FIG. 11, the control unit 10 rotates the segment around the average normal vector in such a manner that the sum of squares of an error of the common landmark is minimized (S27), and ends the orientation correction process. By ending the orientation correction process, the control unit 10 acquires the orientation-corrected segment as illustrated in FIG. 12.

Figure 13:
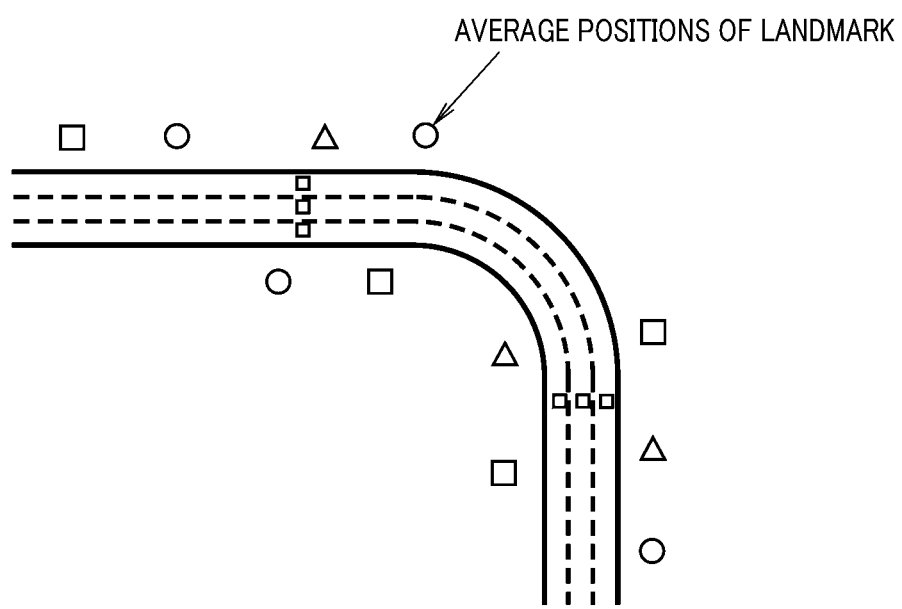
FIG. 13 is a diagram illustrating an aspect of correcting a size and a linear distortion of a segment.

When the orientation correction process is ended, the control unit 10 averages the positions of the landmarks as illustrated in FIG. 13 (S7). When the positions of landmarks are averaged, the control unit 10 determines whether all the acquired segments have been processed (S8). When the control unit 10 determines that all the acquired segments have not been processed and there are unprocessed segments (S8: NO), the control unit 10 returns to step S4 and repeats step S4 and subsequent steps. When the control unit 10 determines that all the acquired segments have been processed and there are no unprocessed segments (S8: YES), the control unit 10 corrects the size and linear distortion of the segment in accordance with the averaged landmark positions (S9).

Figure 14:
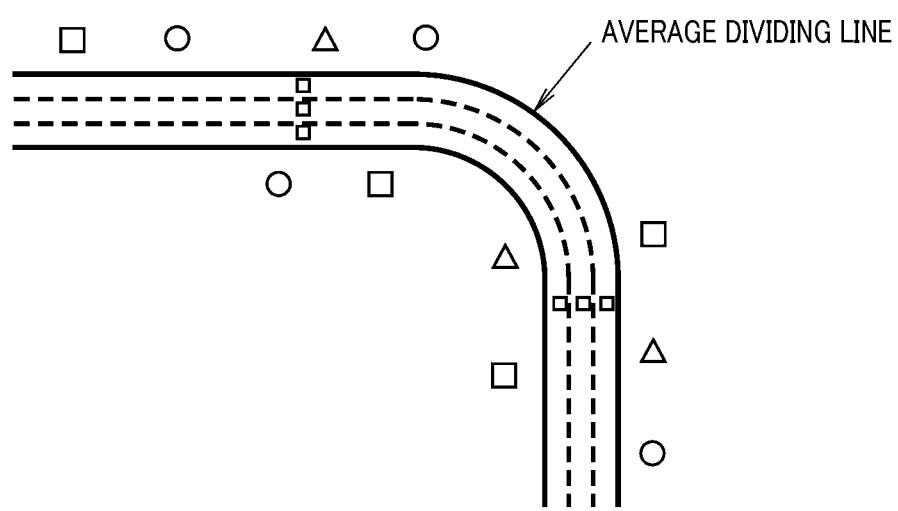
FIG. 14 is a diagram illustrating an aspect of setting a dividing line.

After correcting the segment size and linear distortion, the control unit 10 sets a dividing line (S10, corresponding to the dividing line setting step) as illustrated in FIG. 14. A supplementary process will be described later for the process for setting the dividing line. When a dividing line is set, the control unit 10 identifies the set dividing line as a dividing line on a map, generates map data (S11, corresponds to the map generation step), and ends the map generation process.

After that, the control unit 10 stores the map data generated in this way in the map data storage unit 12b of the storage device 12. In addition, the control unit 10 reads the map data stored in the map data storage unit 12b, and causes the data communication unit 11 to distribute the read map data to the in-vehicle devices 2. Moreover, the condition for the control unit 10 to distribute the map data may be any condition. For example, when a map data distribution request is received, the map data distribution request may be distributed to the in-vehicle devices 2 that has transmitted the map data distribution request, or may be distributed to an unspecified number of in-vehicle devices 2 on a regular basis.

Figure 15:
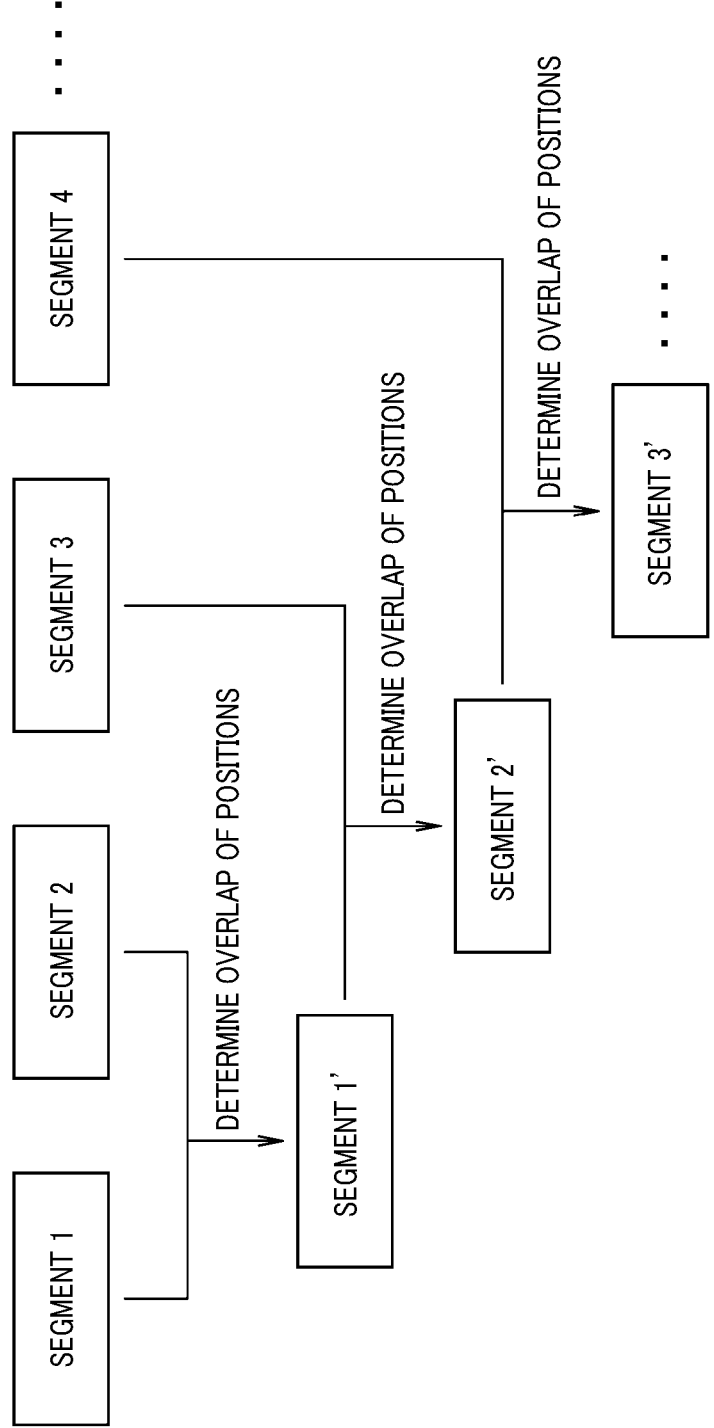
FIG. 15 is a diagram illustrating a process for determining the overlap of positions of a plurality of segments.

The process (S4) for determining the overlap of the positions of the plurality of segments described above will be supplemented with reference to FIG. 15. As illustrated in FIG. 15, when segments 1 to 4 are acquired as a plurality of segments, the control unit 10 first determines the overlap of the positions of the segment 1 and the segment 2, and averages the positions of landmarks in segment 1' generated from the segment 1 and the segment 2 (S7). When determining that a segment 3 exists as an unprocessed segment (S8: NO), the control unit 10 subsequently determines the overlap of the positions of the segment 1' and the segment 3 and averages the positions of landmarks in segment 2' generated from the segment 1' and the segment 3 (S7). When determining that a segment 4 exists as an unprocessed segment (S8: NO), the control unit 10 subsequently determines the overlap of the positions of the segment 2' and the segment 4, and averages the positions of landmarks in segment 3' generated from the segment 2 and the segment 4 (S7). After that, the control unit 10 processes all the acquired plurality of segments, and repeats the above processing until it is determined that there is no unprocessed segment.

Next, the process for setting the common landmark (S5) described above will be supplemented with reference to FIGS. 16 to 27. Here, a case where a segment 1 and a segment 2 are acquired as a plurality of segments will be described. The segment 1 and segment 2 are substantially the same area, and landmarks 1 to 5 of the segment 1 (see FIG. 18) and landmarks 1 to 5 of the segment 2 (see FIG. 19) are the same landmarks. The landmarks 1 to 5 are included in both the segment 1 and segment 2, but a landmark 6 is included only in the segment 1. The landmarks 1 to 6 may be either a single landmark or an integrated landmark.

Figure 16:
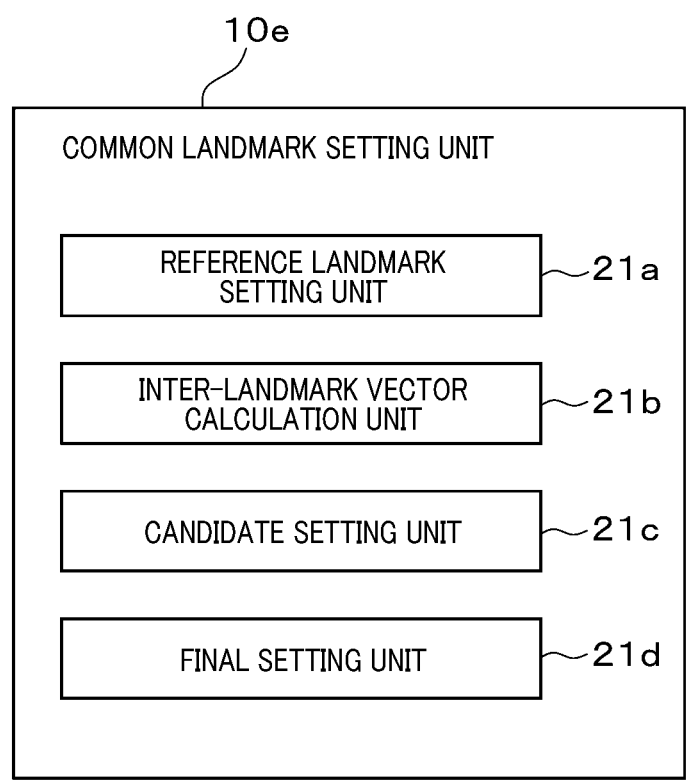
FIG. 16 is a functional block diagram of a common landmark setting unit.
Figure 17:
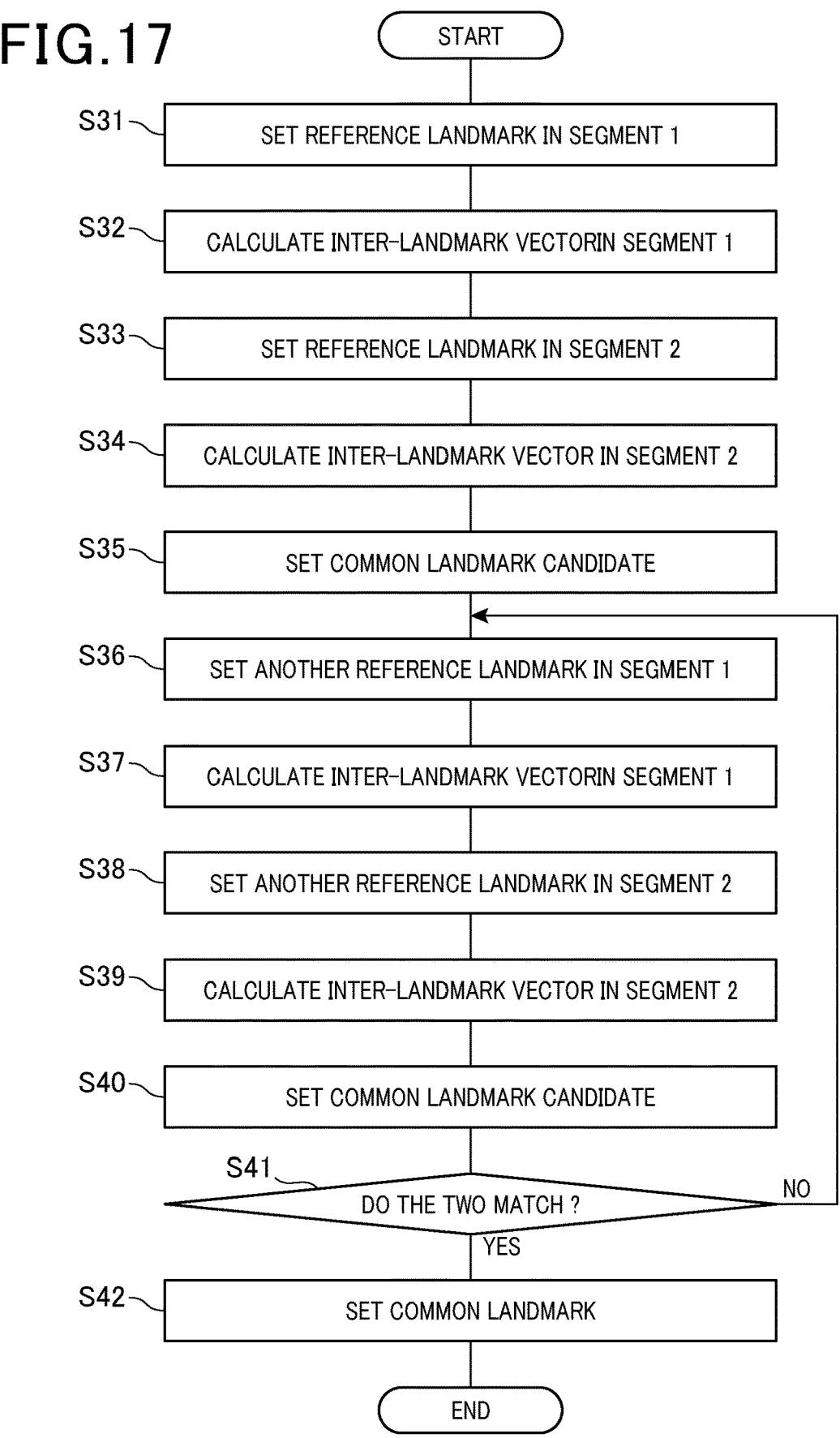
FIG. 17 is a third flowchart.

In the control unit 10, the common landmark setting unit 10e performs pattern matching on the distribution of a plurality of landmarks and sets a common landmark. As illustrated in FIG. 16, the common landmark setting unit 10e includes a reference landmark setting unit 21a, an inter-landmark vector calculation unit 21b, a candidate setting unit 21c, and a final setting unit 21d.

The reference landmark setting unit 21a sets one of the plurality of landmarks included in the segment as a reference landmark. When a reference landmark is set by the reference landmark setting unit 21a, the inter-landmark vector calculation unit (21b) calculates a relative distance and a relative direction from the landmark set as the reference landmark, for all the remaining landmarks that have not been set as the reference landmark, to calculate an inter-landmark vector.

When an inter-landmark vector is calculated by the inter-landmark vector calculation unit 21b for the landmarks included in the segment 1, and an inter-landmark vector is calculated by the inter-landmark vector calculation unit 21b for the landmarks included in the segment 2, the candidate setting unit 21c compares those calculated inter-landmark vectors to set a common landmark candidate.

When one common landmark candidate is set by the candidate setting unit 21c for one reference landmark, and another common landmark candidate is set by the candidate setting unit 21c for another reference landmark, the final setting unit 21d compares those set one common landmark candidate with the other common landmark candidate to set a common landmark.

Figure 18:
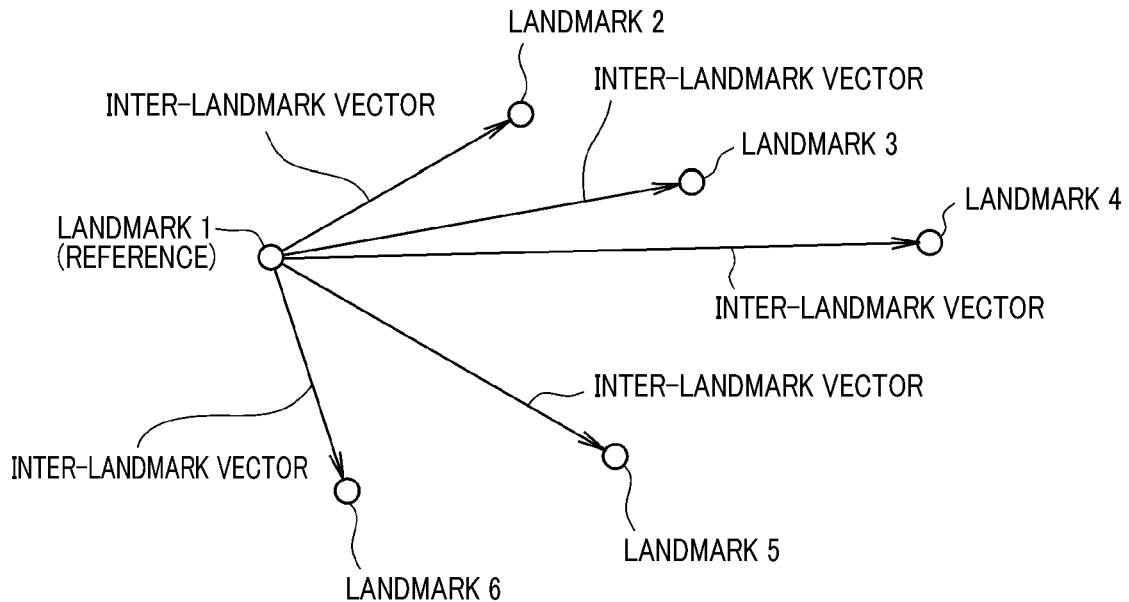
FIG. 18 is a first diagram illustrating an inter-landmark vector.

Hereinafter, description will be made specifically with reference to FIGS. 17 to 27. The control unit 10 sets a reference landmark in a segment 1 (S31, corresponding to the reference landmark setting step), and calculates an inter-landmark vector (S32, corresponding to the inter-landmark vector calculation step). That is, as illustrated in FIG. 18, the control unit 10 sets, for example, a landmark 1 among landmarks 1 to 6, as a reference landmark in the segment 1. The control unit 10 calculates a relative distance and a relative direction from the landmark 1 set as the reference landmark, for all the remaining landmarks 2 to 6 that have not been set as the reference landmark, to calculate an inter-landmark vector.

Figure 19:
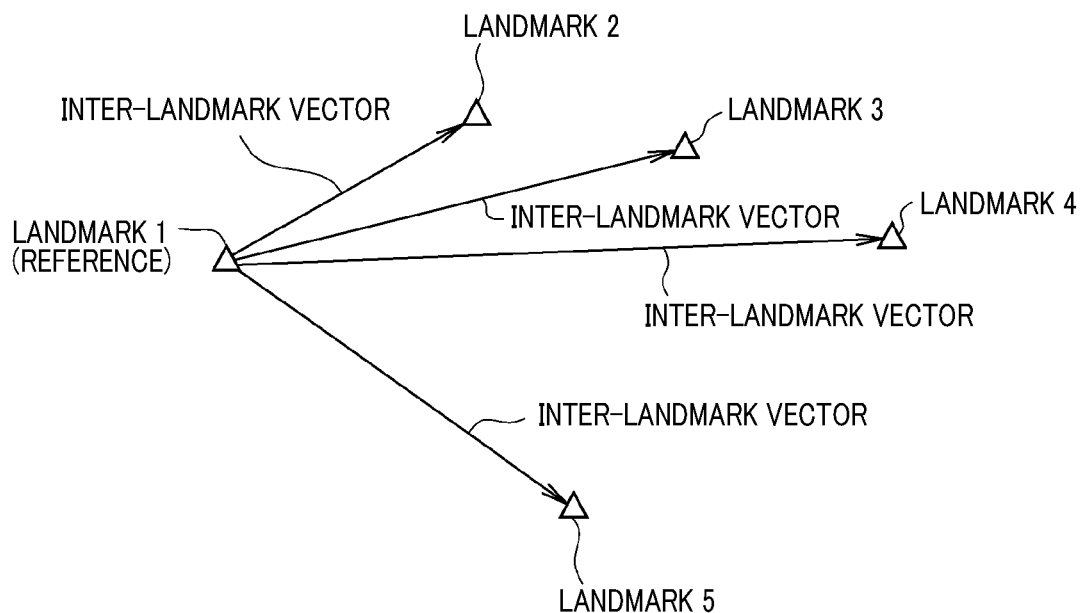
FIG. 19 is a second diagram illustrating an inter-landmark vector.

The control unit 10 sets a reference landmark in a segment 2 (S33, corresponding to the reference landmark setting step), and calculates an inter-landmark vector (S34, corresponding to the inter-landmark vector calculation step). That is, as illustrated in FIG. 19, the control unit 10 sets, for example, a landmark 1 among landmarks 1 to 5, as a reference landmark in the segment 2, as is the case with the segment 1. The control unit 10 calculates a relative distance and a relative direction from the landmark 1 set as the reference landmark, for all the remaining landmarks 2 to 5 that have not been set as the reference landmark, to calculate an inter-landmark vector.

Figure 20:
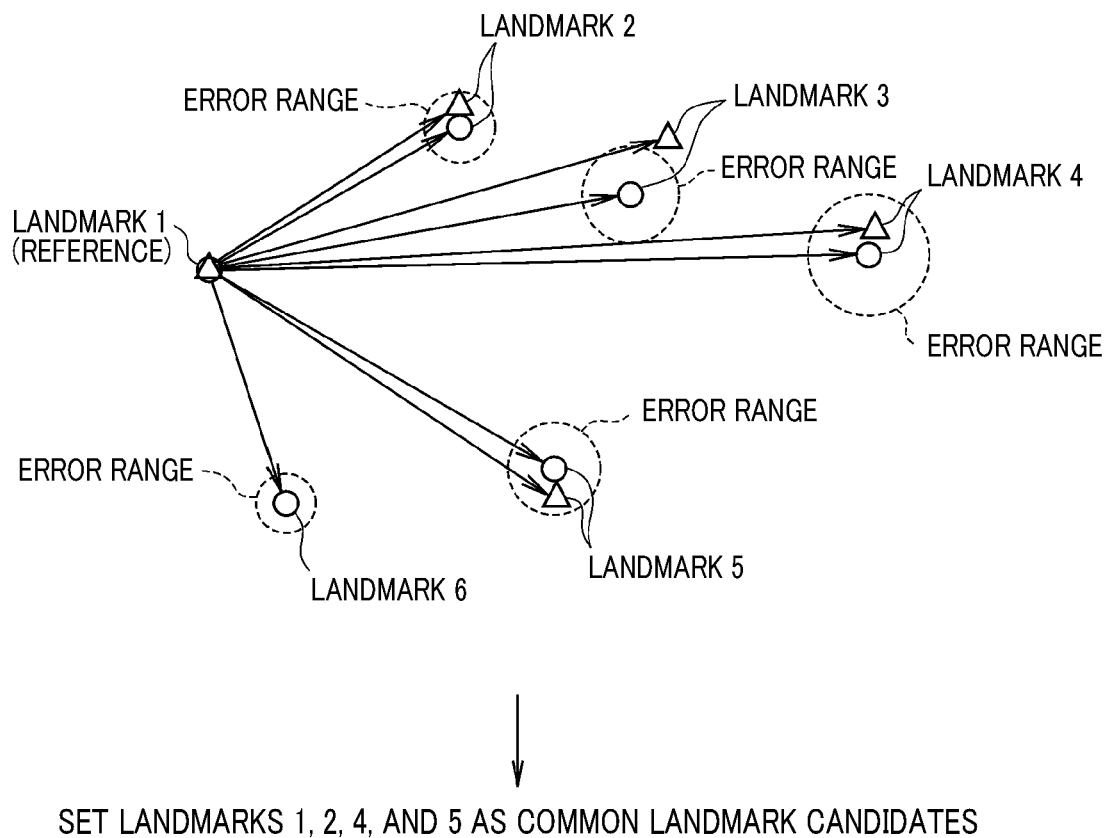
FIG. 20 is a diagram illustrating an aspect of setting a common landmark.

The control unit 10 sets a common landmark candidate on the basis of the distribution of landmarks in the segment 1 and segment 2 (S35, corresponding to the candidate setting step). That is, as illustrated in FIG. 20, the control unit 10 refers to the landmark 1 which is the reference landmark, and compares the inter-landmark vector calculated for the landmarks of the segment 1 and the inter-landmark vector calculated for the landmarks of the segment 2 to determine an error. For example, in a case where the control unit 10 uses the landmark vector calculated for the landmarks of the segment 1 as a reference, the control unit 10 sets a circular error range centered on the positions of landmarks 2 to 6 of the segment 1, on the basis of the magnitude of the inter-landmark vector. The control unit 10 sets the error range relatively large if the magnitude of the inter-landmark vector is relatively large, and sets the error range relatively small if the magnitude of the inter-landmark vector is relatively small.

When the circular error range centered on the positions of the landmarks 2 to 6 of the segment 1 is set, the control unit 10 determines whether the landmarks 2 to 5 of the segment 2 exist within the set error range. In the example of FIG. 20, for example, the control unit 10 determines that landmarks 2, 4, and 5 of the segment 2 each exist within the circular error range centered on the positions of the landmarks 2, 4, and 5 of the segment 1. However, the control unit 10 determines that the landmark 3 of the segment 2 does not exist within the circular error range centered on the position of the landmark 3 of the segment 1.

The control unit 10 determines whether all the landmarks 2 to 5 of the segment 2 exist within the error range, and sets the landmark set as the reference landmark and the landmark existing within the error range, as common landmark candidates. In the example of FIG. 20, the control unit 10 sets the landmark 1 set as the reference landmark and the landmarks 2, 4, and 5 existing within the error range, as common landmark candidates. The control unit 10 removes the landmark 3 that does not exist within the error range from the common landmark candidates, and also removes the landmark 6 that exists in the segment 1 but does not exist in the segment 2 from the common landmark candidates. Moreover, while a case where the inter-landmark vector calculated for the landmarks of the segment 1 is used as a reference has been described above, the inter-landmark vector calculated for the landmarks of the segment 2 may be used as a reference. The control unit 10 sets landmarks 1, 2, 4, and 5 as common landmark candidates even when the inter-landmark vector calculated for the landmarks of the segment 2 is used as a reference.

Figure 21:
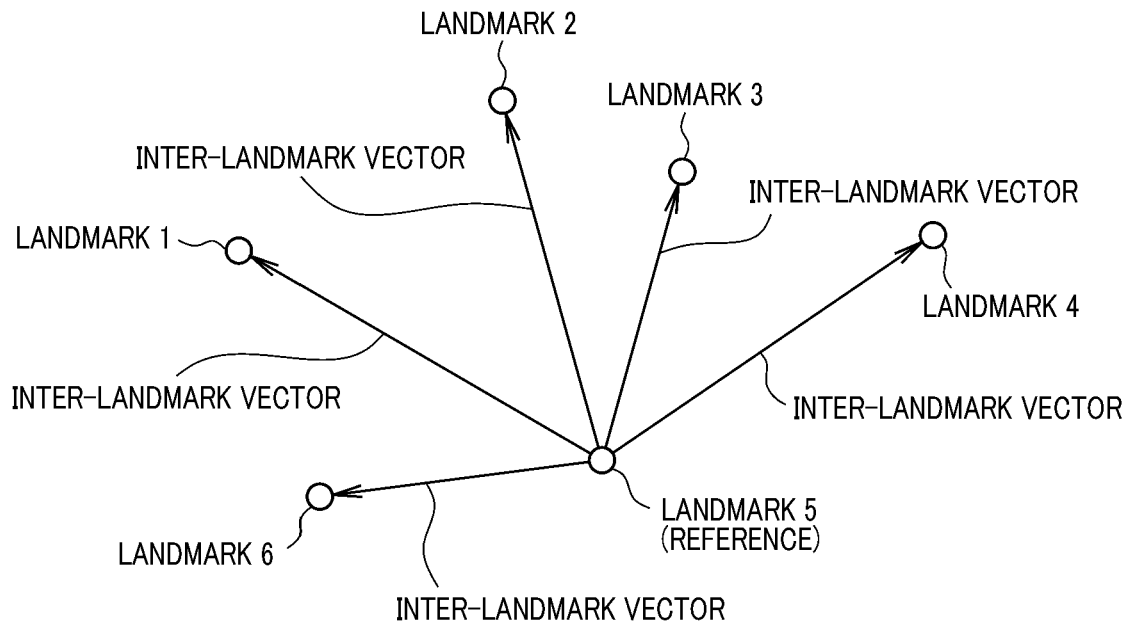
FIG. 21 is a third diagram illustrating an inter-landmark vector.

The control unit 10 changes the reference landmarks for the segment 1 and the segment 2 and repeats the above processing. The control unit 10 sets another reference landmark in the segment 1 (S36, corresponding to the reference landmark setting step), and calculates an inter-landmark vector (S37, corresponding to the inter-landmark vector calculation step). That is, as illustrated in FIG. 21, the control unit 10 sets, for example, a landmark 5 among landmarks 1 to 6, as a reference landmark in the segment 1. The control unit 10 calculates a relative distance and a relative direction from the landmark 5 set as the reference landmark, for all the remaining landmarks 1 to 4, and 6 that have not been set as the reference landmark, to calculate an inter-landmark vector.

Figure 22:
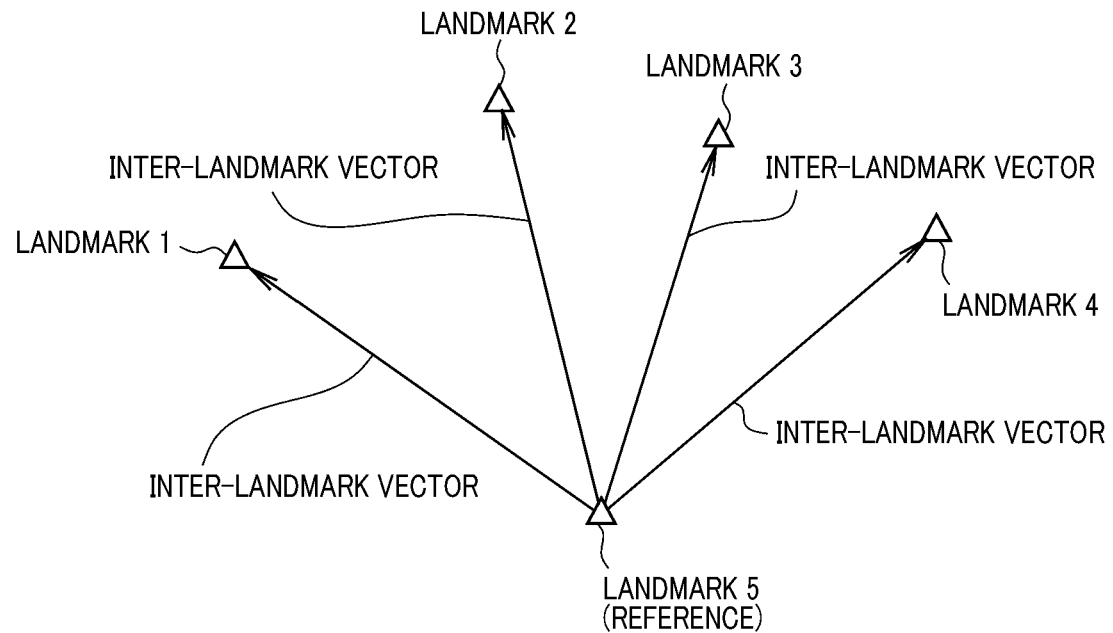
FIG. 22 is a fourth diagram illustrating an inter-landmark vector.

The control unit 10 sets another reference landmark in the segment 2 (S38, corresponding to the reference landmark setting step), and calculates an inter-landmark vector (S39, corresponding to the inter-landmark vector calculation step). That is, as illustrated in FIG. 22, the control unit 10 sets, for example, a landmark 5 among landmarks 1 to 5, as a reference landmark in the segment 2, as is the case with the segment 1. The control unit 10 calculates a relative distance and a relative direction from the landmark 5 set as the reference landmark, for all the remaining landmarks 1 to 4 that have not been set as the reference landmark, to calculate an inter-landmark vector.

Figure 23:
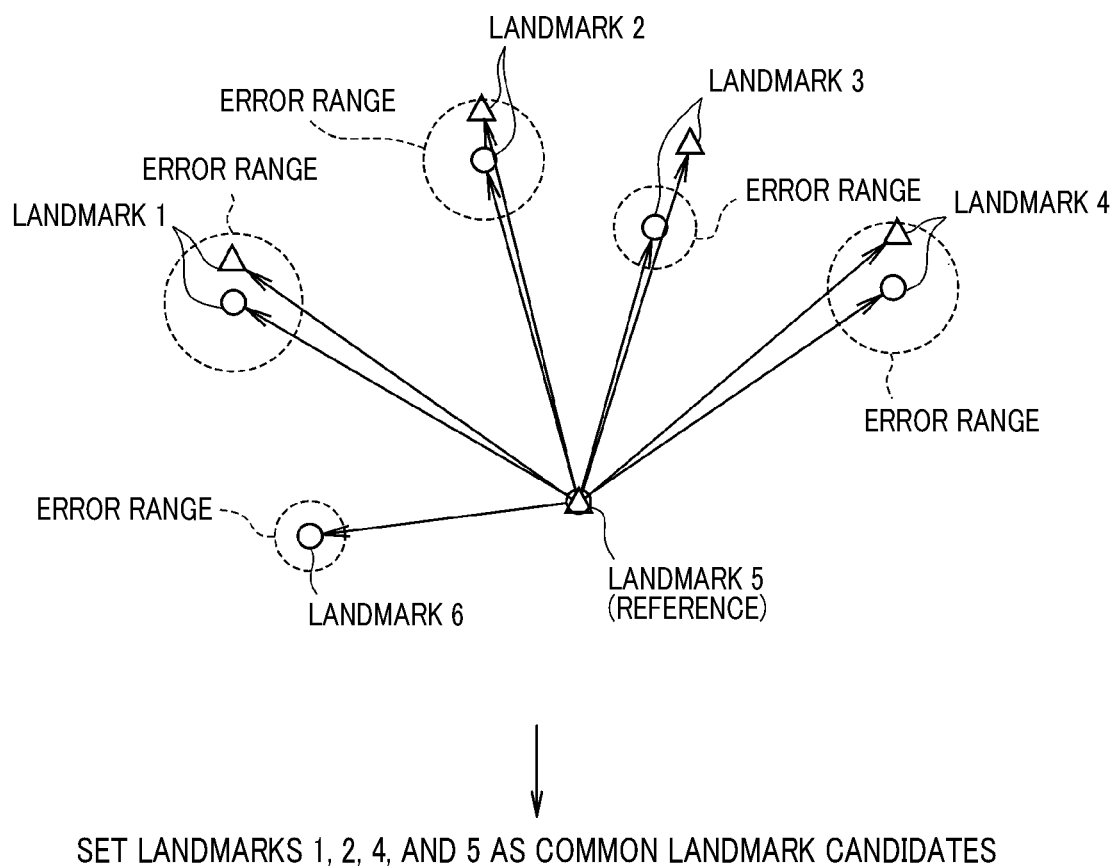
FIG. 23 is a diagram illustrating an aspect of setting a common landmark.

The control unit 10 sets a common landmark candidate on the basis of the distribution of landmarks in the segment 1 and segment 2 (S40, corresponding to the candidate setting step). That is, as illustrated in FIG. 23, the control unit 10 refers to the landmark 5 which is the reference landmark, and compares the inter-landmark vector calculated for the landmarks of the segment 1 and the inter-landmark vector calculated for the landmarks of the segment 2 to determine an error. For example, in a case where the control unit 10 uses the landmark vector calculated for the landmarks of the segment 1 as a reference, the control unit 10 sets a circular error range centered on the positions of landmarks 1 to 4, and 6 of the segment 1, on the basis of the magnitude of the inter-landmark vector. In this case as well, the control unit 10 sets the error range relatively large if the magnitude of the inter-landmark vector is relatively large, and sets the error range relatively small if the magnitude of the inter-landmark vector is relatively small.

When the circular error range centered on the positions of the landmarks 1 to 4, and 6 of the segment 1 is set, the control unit 10 determines whether the landmarks 1 to 4 of the segment 2 exist within the set error range. In the example of FIG. 23, for example, the control unit 10 determines that landmarks 1, 2, and 4 of the segment 2 each exist within the circular error range centered on the positions of the landmarks 1, 2, and 4 of the segment 1. However, the control unit 10 determines that the landmark 3 of the segment 2 does not exist within the circular error range centered on the position of the landmark 3 of the segment 1.

The control unit 10 determines whether all the landmarks 1 to 4 of the segment 2 exist within the error range, and sets the landmark set as the reference landmark and the landmark existing within the error range, as common landmark candidates. In the example of FIG. 23, the control unit 10 sets the landmark 5 set as the reference landmark and the landmarks 1, 2, and 4 existing within the error range, as common landmark candidates. The control unit 10 removes the landmark 3 that does not exist within the error range from the common landmark candidates, and also removes the landmark 6 that exists in the segment 1 but does not exist in the segment 2 from the common landmark candidates. In this case as well, while a case where the inter-landmark vector calculated for the landmarks of the segment 1 is used as a reference has been described above, the inter-landmark vector calculated for the landmarks of the segment 2 may be used as a reference. The control unit 2 10 sets landmarks 1, 2, 4, and 5 as common landmark candidates even when the inter-landmark vector calculated for the landmarks of the segment 2 is used as a reference.

In this way, the control unit 10 sets the common landmark candidate when the landmark 1 is used as the reference landmark and sets the common landmark candidate when the landmark 5 is used as the reference landmark, and determines whether the two match (S41). The control unit 10 determines that the two match, for example, on the condition that the common landmark candidate when the landmark 1 is used as the reference landmark and the common landmark candidate when the landmark 5 is used as the reference landmark completely match. Moreover, if the number of common landmark candidates to be compared is relatively small, the control unit 10 may use the condition of the complete match, and if the number of common landmark candidates to be compared is relatively large, the control unit 10 may use the condition that the match rate is equal to or more than a predetermined ratio, instead of the condition of the complete match.

Figure 24:
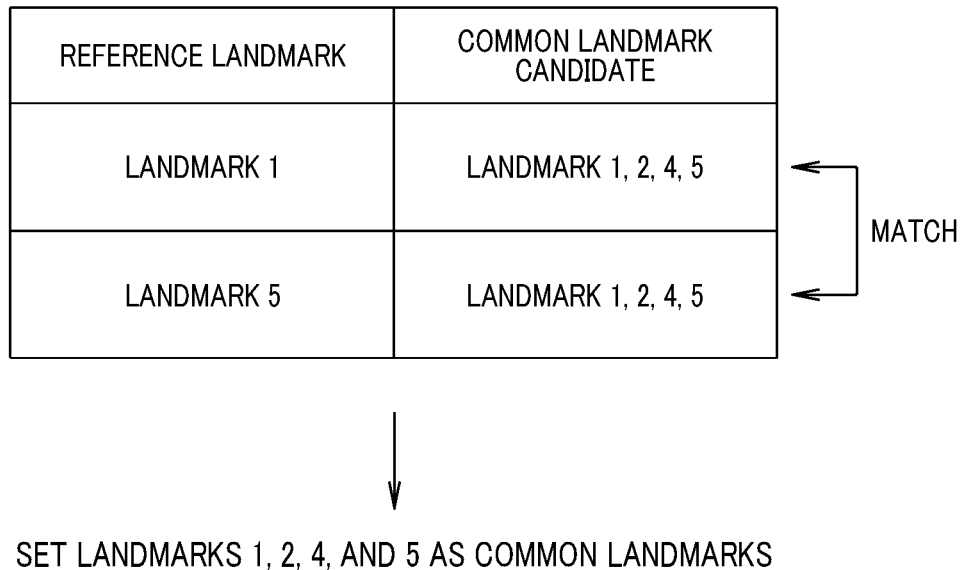
FIG. 24 is a first diagram for explaining a process for setting a common landmark.

When determining that the two matches (S41: YES), the control unit 10 sets the common landmark candidate as a common landmark (S42, corresponding to the setting step). In the examples of FIGS. 20 and 23, the common landmark candidates when the landmark 1 is used as the reference landmark are the landmarks 1, 2, 4, and 5, and the common landmark candidates when the landmark 5 is used as the reference landmark are also the landmarks 1, 2, 4, and 5, and they match. Therefore, as illustrated in FIG. 24, the control unit 10 sets the landmarks 1, 2, 4, and 5 that are the matching common landmark candidates, as common landmarks.

When determining that the two do not match (S41: NO), the control unit 10 returns to step S36 and repeats step S36 and subsequent steps. That is, the control unit 10 changes the reference landmarks for the segment 1 and the segment 2 and repeats the above processing. That is, the control unit 10 sets landmarks 2 to 4 other than landmarks 1 and 5 among landmarks 1 to 5, as a reference landmark.

For example, when determining that the common landmark candidates when the landmark 1 is used as the reference landmark are the landmarks 1, 2, 4, and 5, and the common landmark candidates when the landmark 5 is used as the reference landmark are the landmarks 1, 2, 3, and 5, the control unit 10 changes the reference landmarks for the segment 1 and the segment 2, for example, sets the landmark 2 as a reference landmark, and sets a common landmark candidate.

Figure 25:
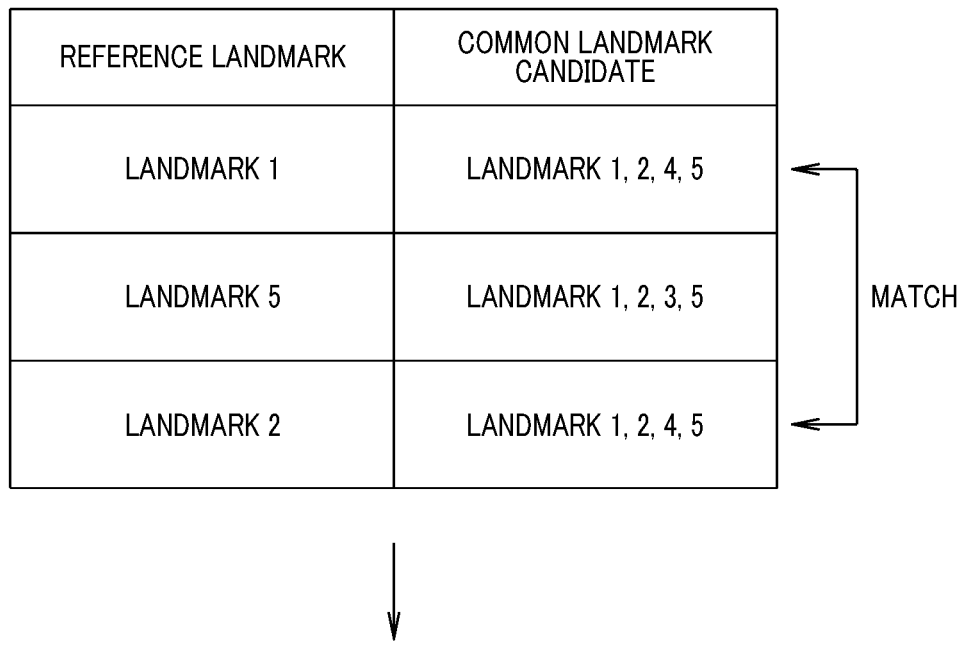
FIG. 25 is a second diagram for explaining a process for setting a common landmark.

When it is determined that the common landmark candidates when the landmark 2 is used as the reference landmark are the landmarks 1, 2, 4, and 5, the common landmark candidates when the landmark 1 is used as the reference landmark and the common landmark candidates when the landmark 2 is used as the reference landmark match. Therefore, as illustrated in FIG. 25, the control unit 10 sets the landmarks 1, 2, 4, and 5 that are the matching common landmark candidates, as common landmarks.

Figure 26:
FIG. 26 is a third diagram for explaining a process for setting a common landmark.

In addition, when it is determined that the common landmark candidates when the landmark 2 is used as the reference landmark are the landmarks 1, 2, 3, and 5, the common landmark candidates when the landmark 5 is used as the reference landmark and the common landmark candidates when the landmark 2 is used as the reference landmark match. Therefore, as illustrated in FIG. 26, the control unit 10 sets the landmarks 1, 2, 3, and 5 that are the matching common landmark candidates, as common landmarks.

Figure 27:
FIG. 27 is a fourth diagram for explaining a process for setting a common landmark.
Figure 28:
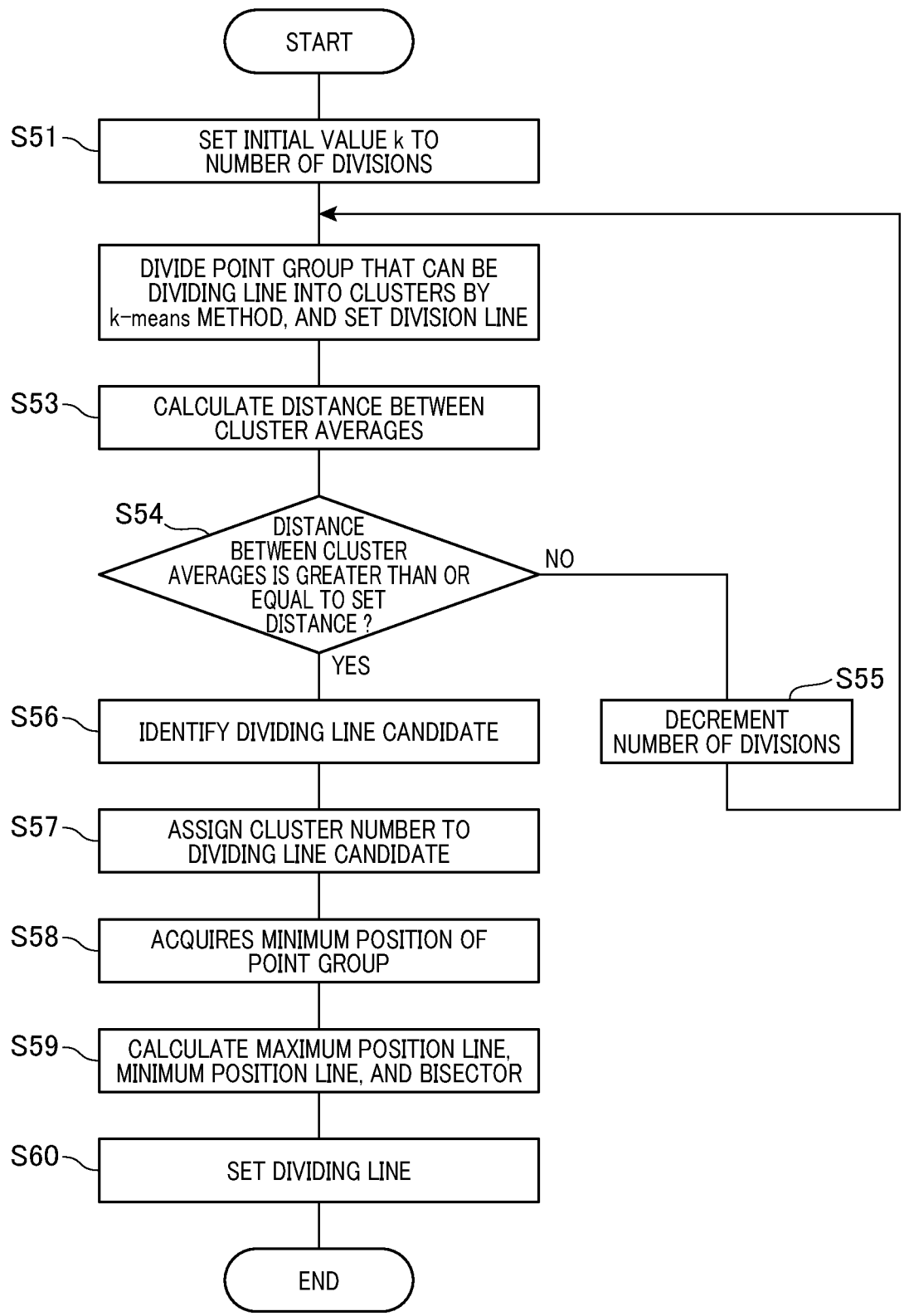
FIG. 28 is a fourth flowchart.

Moreover, in the above, a configuration has been described, in which, in a case where the common landmark candidates match in the two reference landmarks, the matching common landmark candidates are set as the common landmarks. However, in a case where the common landmark candidates match in the three or more reference landmarks, the matching common landmark candidate may be set as the common landmarks. As illustrated in FIG. 27, for example, the control unit 10 may be configured in such a manner that when it is determined that the common landmark candidates when the landmark 1 is used as the reference landmark are the landmarks 1, 2, 4, and 5, the common landmark candidates when the landmark 5 is used as the reference landmark are the landmarks 1, 2, 4, and 5, and the common landmark candidates when the landmark 2 is used as the reference landmark are the landmarks 1, 2, 4, and 5, the landmarks 1, 2, 4, and 5 that are the matching common landmark candidates are set as common landmarks. That is, the number of times the reference landmark is changed, which is a condition for setting the common landmark, may be arbitrary, and the accuracy can be improved by increasing the number of times.

Figure 29:
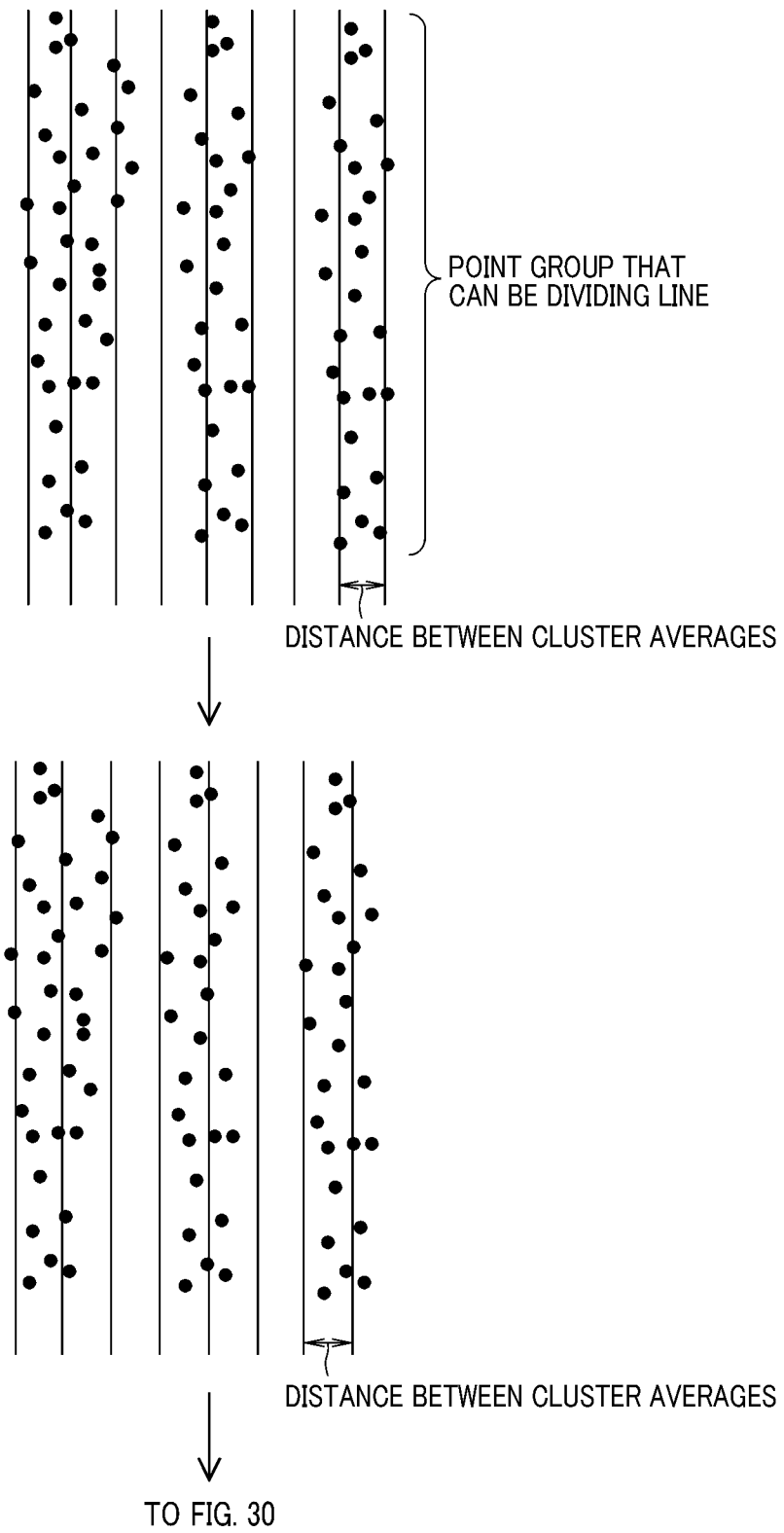
FIG. 29 is a first diagram for explaining a process for setting a dividing line.
Figure 30:
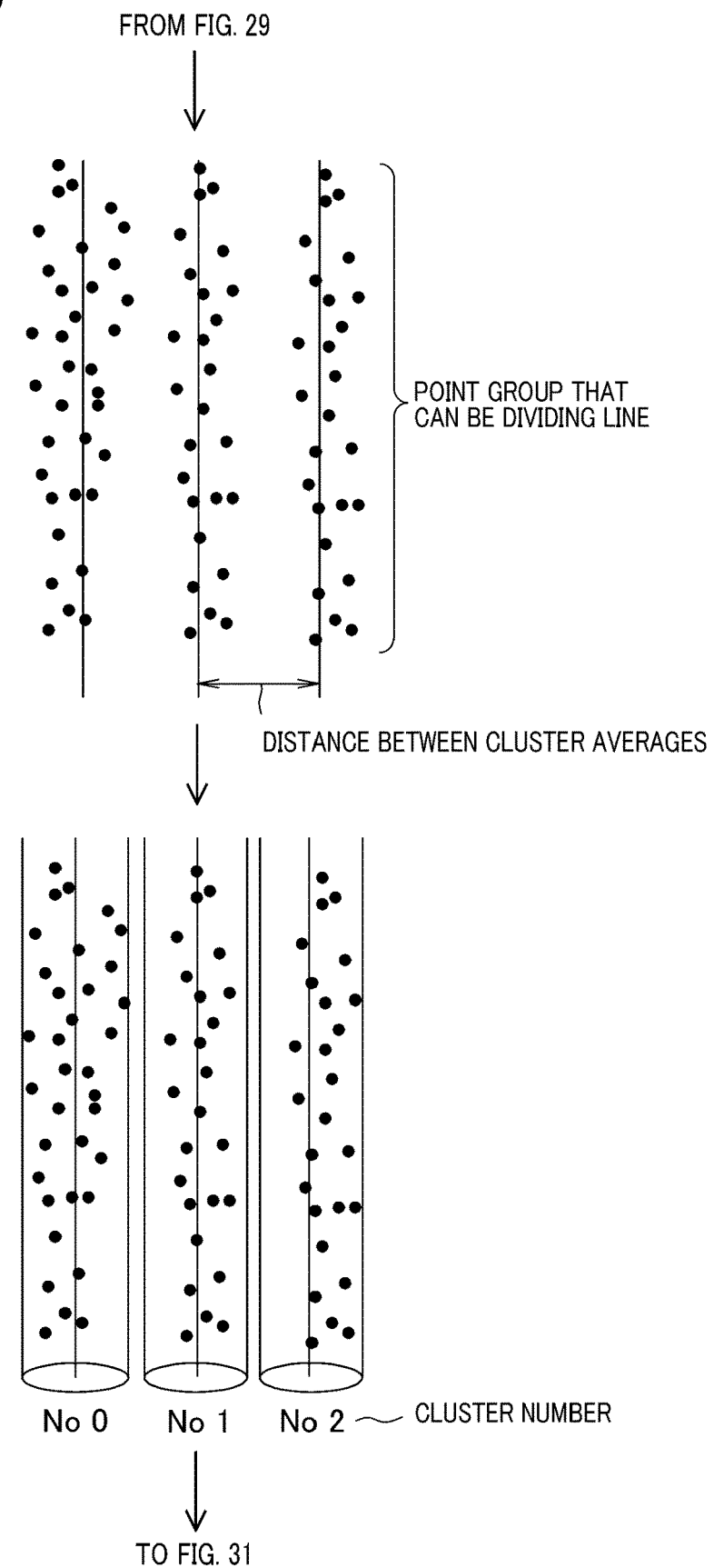
FIG. 30 is a second diagram for explaining a process for setting a dividing line.

Next, the process for setting a dividing line (S10) described above will be supplemented with reference to FIGS. 28 to 31. The control unit 10 sets an initial value k to a number of division (S51), divides the point group that can be a dividing line into clusters by the k-means method, and sets a division line (S52). That is, as illustrated in FIGS. 29 and 30, the control unit 10 sets an initial value k to a number of division, divides the point group that can be a dividing line into clusters by the k-means method, and sets a division line. The control unit 10 calculates a distance between adjacent division lines as a distance between the cluster averages (S53), compares the calculated distance between the cluster averages with a set distance, and determines if the distance between all the cluster averages is equal to or greater than the set distance (S54). When determining that the distance between all the cluster averages is not equal to or greater than the set distance (S54: NO), the control unit 10 decrements the number of division (S55), returns to step S52, and repeats step S52 and subsequent steps.

When determining that the distance between all the cluster averages is equal to or greater than the set distance (S54: YES), the control unit 10 identifies a dividing line candidate (S56), and assigns a cluster number to the identified dividing line candidate (S57). When a cluster number is assigned, the control unit 10 acquires the maximum position and the minimum position of the point group as illustrated in FIG. 31 (S58), and calculates the maximum position line corresponding to the maximum position and the minimum position corresponding to the minimum position, and a bisector that divides the range from the maximum position line to the minimum position line equally by the number of clusters (S59). The control unit 10 calculates a center line between adjacent lines of the calculated maximum position line, minimum position line, and bisector, and sets the calculated center line as a dividing line (S60).

As described above, according to the present embodiment, the following effects can be obtained.

In the server 3, in the segment generated from the camera image captured by the in-vehicle camera 9, the dividing line in the segment is set using the common landmark common with another segment, and the dividing line in the set segment is identified as a dividing line on a map and map data is generated. Rather than using GPS coordinates with large variations, the dividing line in the segment is set using a common landmark, the averaged dividing line is identified as a dividing line on a map, and it is thereby possible to appropriately generate a map with high accuracy even with a small number of samples.

In addition, in the server 3, pattern matching is performed on the distribution of a plurality of landmarks and a common landmark is set. A common landmark can be set by performing a pattern matching method.

In addition, in the server 3, an integrated landmark that integrates a plurality of landmarks in a segment is set, and a common landmark is set not only by using a single landmark but also by using the integrated landmark. By using the integrated landmark, the accuracy of setting the common landmark can be improved, and it is possible to avoid a situation where a different landmark is mistakenly set as the common landmark.

In addition, in the server 3, the position of the segment is corrected, the overlap of the position of the segment is determined, and the common landmark is set in accordance with the determination result. By correcting the position of the segment and determining the overlap of the position of the segment, the accuracy of setting the common landmark can be improved, and it is possible to avoid a situation where a different landmark is mistakenly set as the common landmark.

In addition, in the server 3, the orientation of the segment is corrected in accordance with the position of the common landmark. By using the position of the common landmark, the orientation of the segment can be corrected appropriately.

In addition, in the server 3, the positions of the landmarks in the segment are averaged, and the size of the segment is corrected in accordance with the averaged positions of the landmarks. By averaging the position of the landmarks, the size of the segment can be corrected appropriately.

In addition, in the server 3, the positions of the landmarks in the segment are averaged, and the linear distortion of the segment is corrected in accordance with the averaged positions of the landmarks. By averaging the position of the landmarks, the linear distortion of the segment can be corrected appropriately.

In addition, in the server 3, the map data is distributed to the in-vehicle devices 2. By distributing the map data to the in-vehicle devices 2, the in-vehicle devices 2 can appropriately control the vehicle using the highly accurate map data distributed from the server 3.

While the present disclosure has been described in accordance with the examples, it is understood that the present disclosure is not limited to the examples and structures. The present disclosure also includes various modifications and modifications within an equal range. In addition, various combinations and forms, as well as other combinations and forms including only one element, more, or less, are also within the scope of the present disclosure.

A configuration has been illustrated, in which in the in-vehicle devices 2, for example, every time a predetermined time elapses or the travel distance of the vehicle reaches a predetermined distance, probe data including a segment is transmitted to the server 3. However, a configuration may be employed, in which if the number of landmarks detected is equal to or greater than a predetermined value, the probe data including the segment is transmitted to the server 3, but if the number of landmarks detected is not equal to or greater than the predetermined value, the probe data including the segment is not transmitted to the server 3. That is, for example, there is a case where the number of landmarks detected may not be equal to or greater than a predetermined value due to the presence of a preceding vehicle, or the like. In a case where even if probe data including a segment having a number of landmarks detected is not equal to or greater than the predetermined value is transmitted to the server 3, it is assumed that the probe data is discarded without being processed by the server 3, a configuration for not transmitting the probe data to the server 3 may be employed. By not transmitting probe data unnecessary for the server 3 from the in-vehicle devices 2, the communication cost can be reduced and the load on the network can be reduced.

The control unit and the method thereof described in the present disclosure may be implemented by a dedicated computer provided by configuring a processor and memory programmed to perform one or more functions embodied by a computer program. Alternatively, the control unit and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers including a combination of a processor and memory programmed to perform one or more functions and a processor including one or more hardware logic circuits. In addition, the computer program may be stored in a computer-readable non-transitional tangible recording medium, as an instruction executed by the computer.

What is claimed is:

1. A method for generating a map comprising:
   acquiring a plurality of segments, each of which includes a dividing line and a plurality of landmarks on a road;
   setting at least one common landmark that is common among the landmarks of the segments that are acquired using a common landmark setting;
   setting a dividing line in each of the segments using the at least one common landmark that is set by the common landmark setting;
   identifying the dividing line in each of the segments as a dividing line on a map to generate map data; and
   correcting an orientation of each of the segments in accordance with a position of the at least one common landmark set by the common landmark setting,
   wherein the common landmark setting sets a plurality of common landmarks as the at least one common landmark, and
   wherein correcting of the orientation of each of the segments comprises:
     calculating a center point of gravity of each of the common landmarks to approximate the center point of gravity of each of the common landmarks on a plane;
     calculating a normal vector for the center point of gravity of each of the common landmarks with respect to the plane;
     calculating an average of the center points of gravity as an average center point of gravity;
     calculating an average of the normal vectors as an average normal vector;
     translating each of the segments with respect to the average center point of gravity;
     rotating each of the segments with respect to the average normal vector; and
     correcting the orientation of each of the segments by rotating each of the segments around the average normal vector in such a manner that a sum of squares of an error of each of the common landmarks is minimized, wherein
   the map data is distributed to an in-vehicle device of a vehicle, and
   the in-vehicle device controls the vehicle using the map data.

2. The method for generating the map according to claim 1, wherein
   the common landmark setting performs pattern matching on a distribution of the landmarks to set the at least one common landmark.

3. The method for generating the map according to claim 2, wherein the common landmark setting comprises
   the at least one common landmark is set using:
     a first common landmark candidate as a common landmark candidate set for a first reference landmark included in the landmarks of the segments as the reference landmark; and a second common landmark candidate as the common landmark candidate set for a second reference landmark included in the landmarks of the segments as the reference landmark.

4. The method for generating the map according to claim 1, further comprising
setting an integrated landmark that integrates selected landmarks included in the landmarks of at least one of the segments, wherein
the common landmark setting sets the at least one common landmark using the integrated landmark of the at least one of the segments.

5. The method for generating the map according to claim 1, further comprising:
correcting a position of each of the segments; and
determining whether there is an overlap of the positions of the segments, wherein
the common landmark setting sets the at least one common landmark in accordance with a determination result of the overlap determining.

6. The method for generating the map according to claim 1, further comprising:
averaging positions of the landmarks in each of the segments to calculate an averaged landmark position; and
correcting a size of each of the segments in accordance with the averaged landmark position.

7. The method for generating the map according to claim 1, further comprising:
averaging positions of the landmarks in each of the segments to calculate an averaged landmark position;
correcting a size of each of the segments in accordance with the averaged landmark position; and
correcting a linear distortion of each of the segments in accordance with the averaged landmark position.

8. The method for generating the map according to claim 1, further comprising:
distributing map data generated by the identifying.

9. A map generation device comprising:
a segment acquisition unit configured to acquire a plurality of segments, each of which includes a dividing line and a plurality of landmarks on a road;
a common landmark setting unit configured to set at least one common landmark that is common with the landmarks of the segments acquired by the segment acquisition unit;
a dividing line setting unit configured to set a dividing line in each of the segment using the at least one common landmark that is set by the common landmark setting unit;
a map data generation unit configured to identify the dividing line in each of the segment that is set by the dividing line setting unit as a dividing line on a map to generate map data; and
an orientation correction unit configured to correct an orientation of each of the segments in accordance with a position of the at least one common landmark set by the common landmark setting,
wherein the common landmark setting unit is configured to set a plurality of common landmarks as the at least one common landmark, and
wherein correcting of the orientation of each of the segments by the orientation correction unit comprises:
calculating a center point of gravity of each of the common landmarks to approximate the center point of gravity of each of the common landmarks on a plane;
calculating a normal vector for the center point of gravity of each of the common landmarks with respect to the plane; and
calculating an average of the center points of gravity as an average center point of gravity, wherein
the map data is distributed to an in-vehicle device of a vehicle, and
the in-vehicle device controls the vehicle using the map data.

* * * * *